United States Patent
Wan et al.

(10) Patent No.: US 12,278,996 B2
(45) Date of Patent: *Apr. 15, 2025

(54) LOOP FILTERING IMPLEMENTATION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Shuai Wan, Dongguan (CN); Mingze Wang, Dongguan (CN); Yanzhuo Ma, Dongguan (CN); Junyan Huo, Dongguan (CN); Fuzheng Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,962

(22) Filed: Mar. 9, 2023

(65) Prior Publication Data
US 2023/0209097 A1    Jun. 29, 2023

Related U.S. Application Data

(63) Continuation of application No. 17/397,173, filed on Aug. 9, 2021, now Pat. No. 11,627,342, which is a
(Continued)

(51) Int. Cl.
*H04N 11/02*    (2006.01)
*H04N 19/117*    (2014.01)
(Continued)

(52) U.S. Cl.
CPC .......... *H04N 19/82* (2014.11); *H04N 19/117* (2014.11); *H04N 19/132* (2014.11); *H04N 19/176* (2014.11); *H04N 19/186* (2014.11)

(58) Field of Classification Search
CPC .... H04N 19/82; H04N 19/117; H04N 19/132; H04N 19/176; H04N 19/186
(Continued)

(56) References Cited

U.S. PATENT DOCUMENTS

| 11,627,342 B2* | 4/2023 | Wan ..................... H04N 19/186 |
| | | 375/240.02 |
| 2003/0214508 A1* | 11/2003 | Aleksic ................. G06T 15/503 |
| | | 345/589 |

(Continued)

FOREIGN PATENT DOCUMENTS

| CN | 1816149 A | 8/2006 |
| CN | 103891293 A | 6/2014 |

(Continued)

OTHER PUBLICATIONS

Telephone interview of the EP application No. 19918003.5, issued on Oct. 31, 2023. 8 pages.
(Continued)

*Primary Examiner* — Jayanti K Patel
*Assistant Examiner* — Richard B Carter
(74) *Attorney, Agent, or Firm* — PERKINS COIE LLP

(57) ABSTRACT

Disclosed are a loop filtering implementation method and apparatus, and a computer storage medium. The method comprises: obtaining a picture to be filtered, wherein the picture to be filtered is generated from an original picture during the video encoding of a video to be encoded, the video to be encoded comprises an original picture frame, and the original picture frame comprises the original picture; based on the picture to be filtered, separately obtaining at least two colour components of the picture to be filtered; determining the fusion information of the picture to be filtered, wherein the fusion information is obtained by fusing the at least two colour components; and based on the fusion
(Continued)

information, performing loop filtering processing on the picture to be filtered to obtain at least one colour component subsequent to filtering the picture to be filtered.

10 Claims, 7 Drawing Sheets

Related U.S. Application Data continuation of application No. PCT/CN2019/077372, filed on Mar. 7, 2019.

(51) Int. Cl.
    *H04N 19/132*  (2014.01)
    *H04N 19/176*  (2014.01)
    *H04N 19/186*  (2014.01)
    *H04N 19/82*   (2014.01)

(58) Field of Classification Search
    USPC .............. 375/240.02, 240.03, 240.29, 7.126; 345/589
    See application file for complete search history.

(56) References Cited

U.S. PATENT DOCUMENTS

| | | | |
|---|---|---|---|
| 2004/0034611 | A1 | 2/2004 | Kee et al. |
| 2007/0064117 | A1 | 3/2007 | Nakai et al. |
| 2011/0317073 | A1* | 12/2011 | Chang .................. H04N 19/132 348/642 |
| 2012/0177107 | A1* | 7/2012 | Fu .......................... H04N 19/70 375/240.03 |
| 2012/0294353 | A1* | 11/2012 | Fu ........................ H04N 19/186 375/E7.126 |
| 2013/0215959 | A1* | 8/2013 | Chen .................... H04N 19/117 375/240.02 |
| 2013/0223542 | A1* | 8/2013 | Kim ..................... H04N 19/463 375/240.29 |
| 2019/0052877 | A1 | 2/2019 | Zhang et al. |
| 2020/0213570 | A1* | 7/2020 | Shih ..................... H04N 19/167 |

FOREIGN PATENT DOCUMENTS

| | | |
|---|---|---|
| CN | 105791877 A | 7/2016 |
| CN | 108134932 A | 6/2018 |
| CN | 108184129 A | 6/2018 |
| CN | 109120937 A | 1/2019 |
| EP | 3451670 A1 | 3/2019 |
| WO | 2017222140 A1 | 12/2017 |
| WO | 2019031410 A1 | 2/2019 |

OTHER PUBLICATIONS

Brief communication of the EP application No. 19918003.5, issued on Nov. 17, 2023. 1 page.
Decision to Refuse of the EP application No. 19918003.5, issued on Nov. 29, 2023. 17 pages.
Notice of Re-Transference to the Board of Appeal Trial of the JP application No. 2021-552228, issued on Sep. 26, 2023. 2 pages with English translation.
Reconsideration Examination Report of the JP application No. 2021-552228, issued on Sep. 26, 2023. 5 pages with English translation.
First Final Rejection of the KR application No. 10-2021-7030126, issued on Oct. 17, 2023. 8 pages with English translation.
First Office Action of the ID application No. P00202108144, issued on Jan. 11, 2024. 7 pages with English translation.
Notice of Decision for Rejection of the KR application No. 10-2021-7030126, issued on Jan. 30, 2024. 8 pages with English translation.
Second Office Action of the CN application No. 202111050475.8, issued on Apr. 20, 2023. 11 pages with English translation.
Decision to Grant of the CN application No. 202111050475.8, issued on Jun. 30, 2023. 4 pages with English translation.
Summons to Oral Proceedings of the EP application No. 19918003.5, issued on Jun. 26, 2023. 13 pages.
A Multi-Feature Incremental Learning Neural Network for the Quality Enhancement of Video Reconstructed Pictures in H. 265HEVC, issued o Dec. 15, 2018,School of information Science and Engineering, Hangzhou Normal University, 9 pages with abstract English translation.
Deep Neural Network Compression and Acceleration, issued on Dec. 21, 2018. School of information Science and Engineering, Xiamen University, Xiamen Fujian. 18 pages with abstract English translation.
Multi-modal multi-sc ale convolutional neural network based in-loop filter design for next generation video codec, issued on Feb. 22, 2018. Department of ECE, ASRI, Seoul National University, Seoul, Korea. 5pages.
Office Action of the KR application No. 10-2021-7030126,issued on Apr. 10, 2023. 8 pages with English translation.
Decision of Rejection of the JP application No. 2021-552228, issued on May 19, 2023. 6 pages with English translation.
Dolby Laboratories, Inc. "AHG13: on Luma Adjustment" JCTVC-X0043; JCT-VC of ITU-T SG 16 WP 3 and ISO/IEC JTC 1/SC 29/WG 11; Geneva, CH; May 26-Jun. 1, 2016. 10 pages.
Dolby Laboratories, Inc. "AHG13: on Luma Adjustment" JVET of ITU-T SG 16 WP 3 and ISO/IEC JTC 1/SC 29/WG 11; 24th meeting; Geneva, CH, May 26-Jun. 1, 2016. 10 pages.
Examination Report for European Application No. 19918003.5 issued Dec. 22, 2022. 4 pages.
Extended European Search Report for European Application No. 19918003.5 issued Dec. 23, 2021. 13 pages.
Final Office Action mailed Feb. 23, 2022 in U.S. Appl. No. 17/397,173.
First Examination Report of the Indian application No. 202117036340, issued on Mar. 15, 2022. 6 pages with English Translation.
First Office Action for Chinese Application No. 202111050475.8 issued Nov. 15, 2022. 13 pages with English translation.
First Office Action for the European application No. 19918003.5, issued on May 23, 2022. 5 pages.
Hikvision "Convolutional Neural Network Filter (CNNF) for intra frame" JVET of ITU-T SG 16 WP 3 and ISO/IEC JTC 1/SC 29/WG 11; 9th meeting; Gwangju, Korea, Jan. 20-26, 2018. 9 pages.
Hikvision "Convolutional Neural Network Filter (CNNF) for intra frame" JVET-I0022; JVET of ITU-T SG 16 WP 3 and ISO/IEC JTC 1/SC 29/WG 11; Gwangju, Korea; Jan. 20-26, 2018. 9 pages.
Intel Corporation. "AHG9: Adaptive convolutional neural network loop filter" JVET of ITU-T SG 16 WP 3 and ISO/IEC JTC 1/SC 29/WG 11; 13th meeting; Marrakech, MA, Jan. 9-18, 2019. 9 pages.
International Search Report issued Dec. 10, 2019 of PCT/CN2019/077372 (4 pages).
Jianle Chen et al. "Algorithm description for Versatile Video Coding and Test Model 3 (VTM 3)" JVET0L1002-v1; 12th Meeting: Macao, CN, Oct. 3-12, 2018. 37 pages.
MediaTek Inc. "AHG9: Convolutional neural network loop filter" JVET of ITU-T SG 16 WP 3 and ISO/IEC JTC 1/SC 29/WG 11; 13th meeting; Marrakech, MA, Jan. 9-18, 2019. 6 pages.
MediaTek Inc. "AHG9: Convolutional neural network loop filter" JVET-M0159-v1; JVET of ITU-T SG 16 WP 3 and ISO/IEC JTC 1/SC 29/WG 11; Marrakech, MA; Jan. 9-19, 2019. 6 pages.
Non-final Office Action mailed Aug. 16, 2022 in U.S. Appl. No. 17/397,173.
Non-final Office Action mailed Nov. 8, 2021 in U.S. Appl. No. 17/397,173.
Notice of Allowance issued Dec. 7, 2022 of U.S. Appl. No. 17/397,173, filed Aug. 9, 2021.
Notice of Reasons for Refusal for Japanese Application No. 2021-552228 issued Dec. 6, 2022. 15 pages with English translation.
Dai, Yuanying , et al., "A Convolutional Neural Network Approach for Post-Processing in HEVC Intra Coding", Dai Y, Liu D, Wu F. A Convolutional Neural Network Approach for Post-Processing in HEVC Intra Coding[J]. 2017. (12 pages)., 2017, pp. 1-12.

(56) References Cited

OTHER PUBLICATIONS

Hisaio, Yu-Ling, et al., "AHG9: Convolutional neural network loop filter", Joint Video Experts Team (JVET) of ITU-T SG 16 WP 3 and ISO/IEC JTC 1/SC 29/WG 11 13th Meeting: Marrakech, MA, Jan. 9-18, 2019, Hsiao, Y-L, et al., JVET-M0159-AHG9: Convolutional neural network loop filter (82 pages)., 2019, pp. 1-16.
Kawamura, Kei, et al., "AHG9: Convolution Neural Network Filter", Joint Video Experts Team (JVET)—of ITU-T SG 16 WP 3 and ISO/IEC JTC 1/SC 29/WG 11—12th Meeting: Macao, CN, Oct. 3-12, 2018—Document: JVET-L383—Kawamura, K., et al., AHG9: Convolution Neural Network Filter (13 pages)., 2018, pp. 1-3.
Kuanar, Shiba, et al., "Deep Learning Based HEVC In-Loop Filtering for Decoder Quality Enhancement,", S. Kuanar, C. Conly and K. R. Rao, "Deep Learning Based HEVC In-Loop Filtering for Decoder Quality Enhancement," 2018 Picture Coding Symposium (PCS), San Francisco, CA, 2018, pp. 164-168, 2018, pp. 164-168.
Lin, Chaoyi, et al., "AHG9: Convolutional Neural Network Filter (CNNF) for Intra Frame", Joint Video Experts Team (JVET)—of ITU-T SG 16 WP 3 and ISO/IEC JTC 1/SC 29/WG 11—13th Meeting: Marrakech, MA, Jan. 9-18, 2019—Document: JVET-M0351—Lin, C., et al., AHG9: Convolutional Neural Network Filter (CNNF) for Intra Frame (14 pages)., 2019, pp. 1-7.
Park, Woon-Sung, et al., "CNN-based in-loop filtering for coding efficiency improvement", Park W S, Kim M. CNN-based in-loop filtering for coding efficiency improvement[C]// 2016 IEEE 12th Image, Video, and Multidimensional Signal Processing Workshop (IVMSP). IEEE, 2016.(5 pages)., 2016, pp. 1-5.
Yin, Hujun, et al., "AHG9: Adaptive convolutional neural network loop filter", Joint Video Experts Team (JVET)—of ITU-T SG 16 WP 3 and ISO/IEC JTC 1/SC 29/WG 11—13th Meeting: Marrakesh, Jan. 2019 Document: JVET-M0566—Yin, H., et al., AHG9: Adaptive convolutional neural network loop filter (51 pages)., 2019, pp. 1-19.
Written Opinion Mailed Dec. 10, 2019 in PCT Application No. PCT/CN2019/077372.
Supplemental Notice of Allowability Mailed Feb. 21, 2023 in U.S. Appl. No. 17/397,173.
Notice of Reasons for Refusal of Japanese application No. 2021-552228 issued on Jun. 25, 2024, 19 pages with English translation.
Notice of Reasons for Refusal of the Japanese application No. 2021-552228, issued on Nov. 22, 2024. 15 pages with English translation.
JVET-J0018, Chih-Wei Hsu et al., Description of SDR video coding technology proposal by MediaTek, Joint Video Experts Team (JVET) of ITU-T SG 16 WP 3 and ISO/IEC JTC 1/SC 29/WG 11 10th Meeting: San Diego, US, Apr. 11, 2018. 14 pages.
JVET-N0133-v1, Shuai Wan et al., CE13-related: In-loop filter with only CNN-based filter, Joint Video Experts Team (JVET) of ITU-T SG 16 WP 3 and ISO/IEC JTC1/SC 29/WG 11 14th Meeting: Geneva, CH, Mar. 12, 2019. 7 pages.

\* cited by examiner

LOOP FILTERING IMPLEMENTATION METHOD AND APPARATUS, AND COMPUTER STORAGE MEDIUM

CROSS-REFERENCE TO RELATED APPLICATION

This application is a continuation application of U.S. application Ser. No. 17/397,173 filed on Aug. 9, 2021, which is a continuation application of International PCT Application No. PCT/CN2019/077372 filed on Mar. 7, 2019, the entire content of which are hereby incorporated by reference.

TECHNICAL FIELD

Implementations of the present disclosure relate to the technical field of picture processing, in particular to an in-loop filtering implementation method, apparatus, and a computer storage medium.

BACKGROUND

In a video encoding and decoding system, most video encoding adopts a hybrid encoding framework based on block-shaped Coding Units (CUs). Adjacent CUs adopt different coding parameters, e.g., different transform processes, different Quantization Parameters (QPs), different prediction modes, different reference picture frames, etc. Moreover, as the errors caused by each CU and their distribution attributes are independent from each other, and the discontinuous adjacent CU boundaries causes block effect, the subjective and objective quality of reconstructed pictures and even the prediction accuracy of the subsequent encoding and decoding are affected.

For this, in the encoding and decoding process, an in-loop filter is used to improve the subjective and objective quality of reconstructed pictures. For a traditional in-loop filter, generally, the features of distorted pictures are artificially generalized, the structure of the filter is artificially designed, and the coefficients of the filter are artificially configured, e.g., de-blocking filtering, sample adaptive offset and adaptive loop filtering, etc. These filters that rely on artificial design do not fit the optimal filter properly, have relatively poor adaptive ability and filtering effect, and require the filter-related parameters depending on local statistical information to be written into the code stream at the encoding end in order to ensure consistency between the encoding end and the decoding end, which increases the number of encoding bits.

With the rapid development of deep learning theory, Convolutional Neural Network (CNN) is proposed in the industry to perform filtering processing on reconstructed pictures so as to remove picture distortion, which significantly enhances the subjective and objective quality, as compared with the traditional in-loop filter. However, the existing CNN filters do not make full and comprehensive use of relevant information, resulting in limited enhancement in the subjective and objective quality of reconstructed pictures.

SUMMARY

Implementations of the present disclosure provide an in-loop filtering implementation method, an in-loop filtering implementation apparatus, and a computer storage medium.

The technical solutions of the implementations of the present disclosure may be implemented as follows.

In a first aspect, an implementation of the present disclosure provides an in-loop filtering implementation method, including:

acquiring a to-be-filtered picture, wherein the to-be-filtered picture is generated from an original picture during video encoding of a to-be-encoded video, the to-be-encoded video includes an original picture frame, and the original picture frame includes the original picture;

separately obtaining at least two colour components of the to-be-filtered picture, based on the to-be-filtered picture;

determining fusion information of the to-be-filtered picture, wherein the fusion information comprises at least information obtained by fusing the at least two colour components; and performing in-loop filtering processing on the to-be-filtered picture based on the fusion information to obtain at least one filtered colour component of the to-be-filtered picture.

In a second aspect, an implementation of the present disclosure provides an in-loop filtering implementation apparatus, including an acquiring unit, a splitting unit, a determining unit and a filtering unit, wherein the acquiring unit is configured to acquire a to-be-filtered picture, wherein the to-be-filtered picture is generated from an original picture during video encoding of a to-be-encoded video, the to-be-encoded video includes an original picture frame, and the original picture frame includes the original picture;

the splitting unit is configured to separately obtain at least two colour components of the to-be-filtered picture, based on the to-be-filtered picture;

the determining unit is configured to determine fusion information of the to-be-filtered picture, wherein the fusion information is obtained by fusing the at least two colour components; and the filtering unit is configured to perform in-loop filtering processing on the to-be-filtered picture based on the fusion information to obtain at least one filtered colour component of the to-be-filtered picture.

In a third aspect, an implementation of the present disclosure provides an in-loop filtering implementation apparatus, including a memory and a processor, wherein the memory is configured to store a computer program which is capable of being run on the processor; and the processor is configured to perform acts of the method in the first aspect when the computer program is run.

In a fourth aspect, an implementation of the present disclosure provides a computer storage medium on which an in-loop filtering implementation program is stored, when the in-loop filtering implementation program is executed by at least one processor, the acts of the method in the first aspect being implemented.

BRIEF DESCRIPTION OF DRAWINGS

FIG. 4 is a schematic diagram of a structure of a block dividing matrix provided by an implementation of the present disclosure.

DETAILED DESCRIPTION

In order to understand features and technical contents of the implementations of the present disclosure in more detail, implementation of the implementations of the present disclosure will be described in detail below in conjunction with the accompanying drawings, which are for reference only and are not intended to limit the implementations of the present disclosure.

In a video encoding and decoding system, a to-be-encoded video includes an original picture frame, and the original picture frame includes an original picture. The original picture is subjected to various processing, such as prediction, transform, quantization, reconstruction, filtering, etc. During these processing, the processed video picture may have shifted in pixel values relative to the original picture, resulting in visual impairment or artifacts. In addition, under the block-shaped CU-based hybrid coding framework adopted by most video encoding and decoding systems, block effect is produced, as adjacent coding blocks adopt different coding parameters (e.g., different transform processes, different QPs, different prediction modes, different reference picture frames, etc.), the coding blocks are independent from one another in the magnitude of errors of introduction and distribution characteristics, and boundaries of adjacent coding blocks are discontinuous. These distortions affect the subjective and objective quality of reconstructed pictures, and will even affect the prediction accuracy of the subsequent encoding and decoding if the reconstructed pictures are used as reference pictures for the subsequent encoding of pixels, thereby affecting the bit size in the video code stream. Therefore, in a video encoding and decoding system, an In-Loop Filter is often added to improve the subjective and objective quality of reconstructed pictures.

Figure 1:
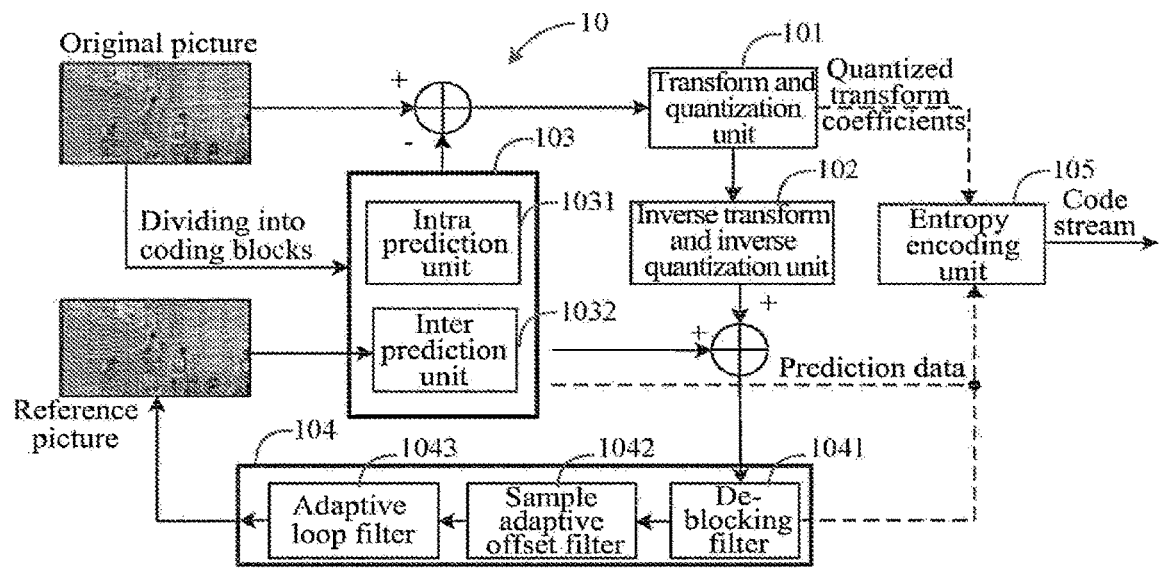
FIG. 1 is a schematic diagram of a composition structure of a traditional coding block diagram provided by a related technical solution.

Referring to FIG. 1, a schematic diagram of a composition structure of a traditional coding block diagram 10 provided by a related technical solution is shown. As shown in FIG. 1, the traditional coding block diagram 10 may include components such as a transform and quantization unit 101, an inverse transform and inverse quantization unit 102, a prediction unit 103, a filtering unit 104, and an entropy encoding unit 105. The prediction unit 103 further includes an intra prediction unit 1031 and an inter prediction unit 1032. For an input original picture, Coding Tree Units (CTUs) may be obtained by preliminary division, and CUs may be obtained by continuous content adaptive division of one CTU. A CU generally contains one or more Coding Blocks (CBs). Residual information may be obtained by intra prediction of the coding blocks by the intra prediction unit 1031 or by inter prediction of the coding blocks by the inter prediction unit 1032. The residual information is subjected to the transform and quantization unit 101 to transform the coding blocks, including transforming the residual information from a pixel domain to a transform domain and quantizing the obtained transform coefficients to further reduce the bit rate. After the prediction mode is determined, the prediction unit 103 is further configured to provide selected intra prediction data or inter prediction data to the entropy encoding unit 105. In addition, the inverse transform and inverse quantization unit 102 is used for reconstruction of the coding blocks, to reconstruct in the pixel domain a residual block, from which blocking artifacts are removed by the filtering unit 104, and then add the reconstructed residual block to a decoded picture cache unit to generate a reconstructed reference picture. The entropy encoding unit 105 is configured to encode various coding parameters and quantized transform coefficients. For example, the entropy encoding unit 105 adopts header information coding and Context-based Adaptive Binary Arithmetic Coding (CABAC) algorithm, and may be used for encoding coding information indicating the determined prediction mode and outputting a corresponding code stream.

For the traditional coding block diagram 10 shown in FIG. 1, the filtering unit 104 is an in-loop filter, also called an In-Loop Filter, which may include a De-Blocking Filter (DBF) 1041, a Sample Adaptive Offset (SAO) filter 1042, an Adaptive Loop Filter (ALF) 1043, etc. Among them, the de-blocking filter 1041 is used for implementing de-blocking filtering. In the next generation video coding standard H.266/Versatile Video Coding (VVC), for all coding block boundaries in the original picture, first, the boundary strength is determined according to the coding parameters of both sides of the boundaries, and whether to make a de-blocking filtering decision is determined according to the calculated block boundary degree-of-texture values; and then pixel information of both sides of the coding block boundaries is modified according to the boundary strength and the filtering decision. In the VVC, after the de-blocking filtering is performed, in order to reduce quantization distortion of high-frequency AC coefficients, SAO technique, i.e., the sample adaptive offset filter 1042, is further introduced. Further, starting from the pixel domain, negative values are added to the pixels at the peaks and positive values are added to the pixels at the valleys for compensation processing. In the VVC, after de-blocking filtering and sample adaptive offset filtering are performed, the adaptive loop filter 1043 is further needed for filtering processing. For adaptive loop filtering, an optimal filter in the mean square sense is obtained by calculation according to the pixel value of the original picture and the pixel value of the distorted picture. However, these filters (such as the de-blocking filter 1041, the sample adaptive offset filter 1042, the adaptive loop filter 1043, etc.) not only require fine manual design and lots of determination and decision making, but also require writing, at the encoding end, filter-related parameters (such as filtering coefficients, Flag values indicating whether or not to select the filter, etc.) which rely on local statistical information into the code stream in order to ensure consistency between the encoding end and the decoding end, which increases the number of encoding bits. Moreover, the artificially designed filters do not have a high fitting degree for the complex functions of the real optimization target, and the filtering effect needs to be enhanced.

An implementation of the present disclosure provides an in-loop filtering implementation method, which is applied to an improved coding block diagram, and is mainly distinguished from the traditional coding block diagram 10 shown in FIG. 1 in replacing the de-blocking filter 1041, the sample adaptive offset filter 1042, the adaptive loop filter 1043, etc. in a related technical solution with an improved in-loop filter. In the implementations of the present disclosure, the improved in-loop filter may be a Convolutional Neural Networks (CNN) filter or other filters established by deep learning, which is not specifically limited in the implementations of the present disclosure.

Figure 2:
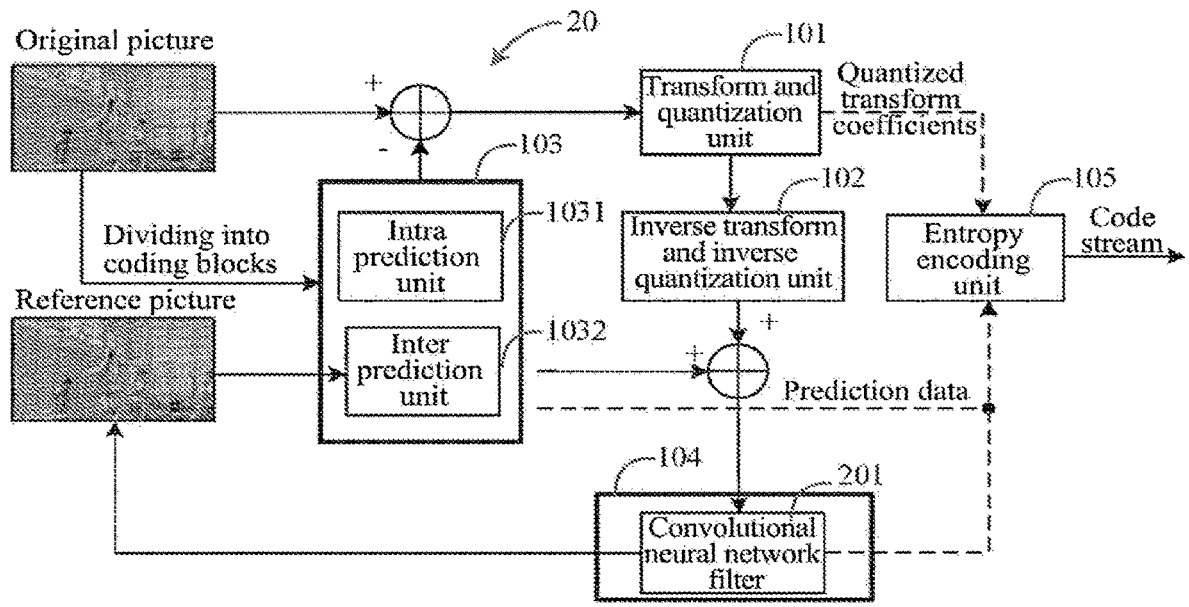
FIG. 2 is a schematic diagram of a composition structure of an improved coding block diagram provided by an implementation of the present disclosure.

Taking a convolutional neural network filter as an example, referring to FIG. 2, a schematic diagram of a composition structure of an improved coding block diagram 20 provided by an implementation of the present disclosure is shown. As shown in FIG. 2, compared with the traditional coding block diagram 10, the filtering unit 104 in the improved coding block diagram 20 includes a convolutional neural network filter 201. The convolutional neural network filter 201 may replace all of the de-blocking filter 1041, the sample adaptive offset filter 1042 and the adaptive loop filter 1043 in FIG. 1, may partially replace, i.e., replace any one or two of, the de-blocking filter 1041, the sample adaptive offset filter 1042 and the adaptive loop filter 1043 in FIG. 1, and may even be used in combination with any one or more of the de-blocking filter 1041, the sample adaptive offset filter 1042 and the adaptive loop filter 1043 in FIG. 1. It should also be noted that for each component shown in FIG. 1 or FIG. 2, e.g., the transform and quantization unit 101, the inverse transform and inverse quantization unit 102, the prediction unit 103, the filtering unit 104, the entropy encoding unit 105 or the convolutional neural network filter 201, it may be either a virtual module or a hardware module. In addition, a person skilled in the art will appreciate that these units do not constitute a limitation on the coding block diagram, and the coding block diagram may include more components or fewer components than shown in the figure, or a combination of certain components, or a different arrangement of components.

In an implementation of the present disclosure, the convolutional neural network filter 201 may be directly deployed at the encoding end and the decoding end after filtering network training, so there is no need to transmit any filter-related parameters. Moreover, the convolutional neural network filter 201 may also fuse auxiliary information such as block dividing information and/or QP information with multiple input colour components. In this way, the relationship between multiple colour components is fully utilized, the calculation complexity is reduced, and the coding rate is saved; and the subjective and objective quality of the video reconstructed pictures in the encoding and decoding process is further improved.

It should be noted that the in-loop filtering implementation method in the implementation of the present disclosure may be applied not only to an encoding system, but also to a decoding system. Generally speaking, in order to save coding rate and ensure that the decoding system can perform correct decoding processing, the in-loop filter of the implementation of the present disclosure must be deployed synchronously in the encoding system and the decoding system.

Detailed description will be given below taking the application in the encoding system as an example.

Figure 3:
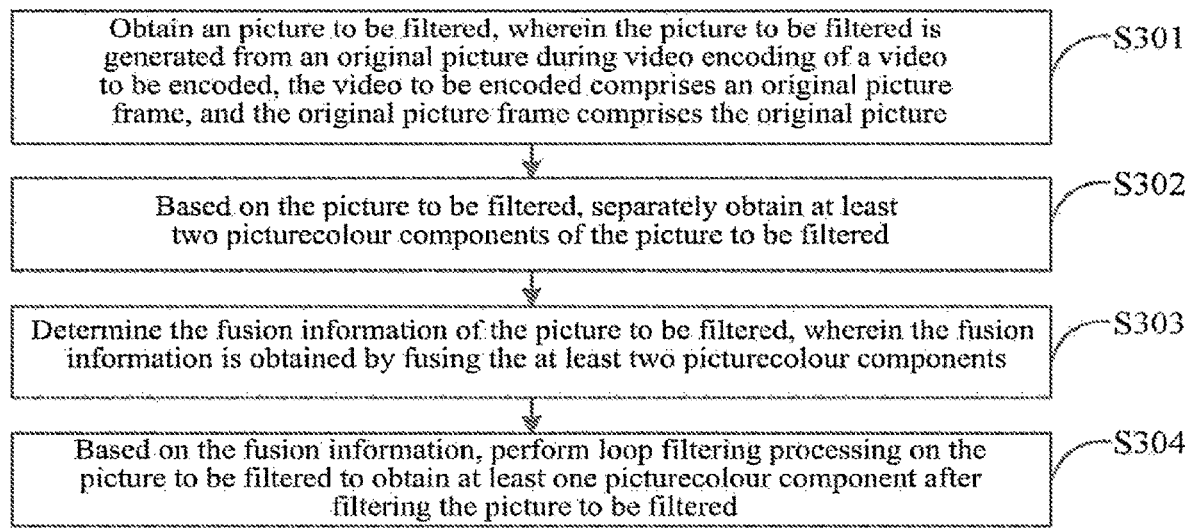
FIG. 3 is a schematic flowchart of an in-loop filtering implementation method provided by an implementation of the present disclosure.

Referring to FIG. 3, a schematic flowchart of an in-loop filtering implementation method provided by an implementation of the present disclosure is shown. The method may include:

S301, acquiring a to-be-filtered picture, wherein the to-be-filtered picture is generated from an original picture during video encoding of a to-be-encoded video, the to-be-encoded video includes an original picture frame, and the original picture frame includes the original picture;

S302, separately obtaining at least two colour components of the to-be-filtered picture, based on the to-be-filtered picture;

S303, determining fusion information of the to-be-filtered picture, wherein the fusion information is obtained by fusing the at least two colour components; and S304, performing in-loop filtering processing on the to-be-filtered picture based on the fusion information to obtain at least one filtered colour component of the to-be-filtered picture.

It should be noted that the original picture may be divided into CTUs, or further divided into CUs from CTU. That is, the block dividing information in the implementations of the present disclosure may refer to CTU dividing information, and may also refer to CU dividing information. In this way, the in-loop filtering implementation method of the implementation of the present disclosure may be applied not only to CU-level in-loop filtering, but also to CTU-level in-loop filtering, which is not specifically limited in the implementations of the present disclosure.

In an implementation of the present disclosure, after a to-be-filtered picture is acquired, at least two colour components of the to-be-filtered picture are separately obtained based on the to-be-filtered picture, and this processing may be regarded as a splitting stage for obtaining at least two colour components separately. Then fusion information of the to-be-filtered picture is determined, wherein the fusion information is obtained by fusing the at least two colour components, and this processing may be regarded as a merging stage for fusing at least two colour components. In this way, the implementation of the present disclosure employs a concatenate processing structure, and by fusing the input multiple colour components, the relationship between the multiple colour components is fully utilized, and the issue that multiple complete network forward calculations are needed for these multiple colour components is effectively avoided, thereby reducing the calculation complexity and saving the coding rate. Finally, in-loop filtering processing is performed on the to-be-filtered picture based on the fusion information to obtain at least one filtered colour component of the to-be-filtered picture. In this way, filtering can be further assisted by fusion information, which improves the subjective and objective quality of video reconstructed pictures in the encoding and decoding process.

In some implementations, the colour components include a first colour component, a second colour component and a third colour component, wherein the first colour component represents a luma component, the second colour component represents a first chroma component, and the third colour component represents a second chroma component.

It should be noted that in video pictures, the first colour component, the second colour component and the third colour component are generally used to characterize the original picture or the to-be-filtered picture. In the luma-chroma component representation method, these three colour components are respectively a luma component, a blue chroma (color difference) component and a red chroma (color difference) component. Specifically, the luma component is usually represented by the symbol Y, the blue chroma component is usually represented by the symbol Cb, and may also be represented by U, and the red chroma component is usually represented by the symbol Cr, and may also be represented by V. In an implementation of the present disclosure, the first colour component may be a luma component Y, the second colour component may be a blue chroma component U, and the third colour component may be a red chroma component V, which, however, is not specifically limited in the implementations of the present disclosure. At least one colour component represents one or more of the first colour component, the second colour component and the third colour component. At least two colour components may be the first colour component, the second colour component and the third colour component; or may be the first colour component and the second colour component; or may be the first colour component and the third colour component; or even may be the second colour component and the third colour component, which is not specifically limited in the implementations of the present disclosure.

In the next generation video coding standard VVC, the corresponding test model is the VVC Test Model (VTM). When test is conducted with the VTM, for the current standard test sequence, YUV is in a 4:2:0 format. In the to-be-encoded video in this format, each frame of picture may be composed of three colour components: a luma component (represented by Y) and two chroma components (represented by U and V). Assuming that the original picture in the to-be-encoded video has a height of H and a width of W, size information corresponding to the first colour component is H×W, and size information corresponding to the second colour component or the third colour component is $H/2 \times W/2$. It should be noted that in an implementation of the present disclosure, description will be made by taking the case as an example where YUV is in a 4:2:0 format, but the in-loop filtering implementation method of the implementation of the present disclosure is also applicable to other sampling formats.

Taking the case as an example where YUV is in a 4:2:0 format, since the size information of the first colour component is different from that of the second colour component or the third colour component, in order to input the first colour component and/or the second colour component and/or the third colour component into an in-loop filter model at one time, sampling or recombining processing needs to be performed on these three colour components so that the three colour components have the same spatial size information.

In some implementations, pixel rearrangement processing (which may also be referred to as down-sampling processing) may be performed on high-resolution colour components so that the three colour components have the same spatial size information. Specifically, before the separately obtaining at least two colour components of the to-be-filtered picture based on the to-be-filtered picture, the method further includes:

selecting a high-resolution colour component from the at least two original colour components of the to-be-filtered picture; and performing pixel rearrangement processing on the high-resolution colour component.

It should be noted that, before other processing is performed, the three colour components (e.g., the first colour component, the second colour component and the third colour component) included in the original picture are original colour components. If the first colour component is a luma component, the second colour component is a first chroma component and the third colour component is a second chroma component, the high-resolution colour component is the first colour component, and in such a case, pixel rearrangement processing needs to be performed on the first colour component. Illustratively, taking an original picture having a size of 2×2 as an example, it is converted into 4 channels, that is, a tensor of 2×2×1 is arranged into a tensor of 1×1×4; then when the size information of the first colour component of the original picture is H×W, it can be converted into the form of $H/2 \times W/2 \times 4$ by pixel rearrangement processing before in-loop filtering; and since the size information of the second colour component and the size information of the third colour component are both $H/2 \times W/2$, then the spatial size information of the three colour components can be the same. Subsequently, the first colour component, the second colour component and the third colour component after pixel rearrangement processing are combined, i.e., transformed into the form of $H/2 \times W/2 \times 6$, and input to the improved in-loop filter.

In some implementations, the low-resolution colour components may also be up-sampled so that the three colour components have the same spatial size information. Specifically, before the separately obtaining at least two colour components of the to-be-filtered picture based on the to-be-filtered picture, the method further includes:

selecting a low-resolution colour component from the at least two original colour components of the to-be-filtered picture; and performing up-sampling processing on the low-resolution colour component.

It should be noted that in addition to the pixel rearrangement processing (i.e., downward adjustment) of the size information for the high-resolution colour component, in an implementation of the present disclosure, up-sampling processing (i.e., upward adjustment) may also be performed on the low-resolution colour component. In addition, for the low-resolution colour component, not only up-sampling processing, but also deconvolution processing, and even super-resolution processing may be performed, which have the same effect, and are not specifically limited in the implementations of the present disclosure.

It should be further noted that, before other processing is performed, the three colour components (e.g., the first colour component, the second colour component and the third colour component) included in the original picture are original colour components. If the first colour component is a luma component, the second colour component is a first chroma component and the third colour component is a second chroma component, the low-resolution colour component is the second colour component or the third colour component, and in such a case, up-sampling processing needs to be performed on the second colour component or the third colour component. Illustratively, when the size information of the second colour component and the size information of the third colour component of the original picture are both $2/H \times 2/W$, they can be converted into the form of H×W by up-sampling processing before in-loop filtering; and as the size information of the first colour component is H×W, then the three colour components can have the same spatial size information, and the second colour component after up-sampling and the third colour component after up-sampling will be consistent with the first colour component in resolution.

In some implementations, the acquiring a to-be-filtered picture includes:

performing video encoding processing on an original picture in a to-be-encoded video, and taking a generated reconstructed picture as the to-be-filtered picture; or performing video encoding processing on an original picture in a to-be-encoded video to generate a reconstructed picture; and performing preset filtering processing on the reconstructed picture, and taking the picture after preset filtering as the to-be-filtered picture.

It should be noted that, during video encoding the original picture in the to-be-encoded video based on the improved coding block diagram 20, when video encoding processing is performed on the original picture, the original picture is subjected to the processing, such as CU division, prediction, transform and quantization, and in order to obtain a reference picture for video encoding the subsequent to-be-encoded picture, the processing such as inverse transform and inverse quantization, reconstruction and filtering may also be performed. In this way, the to-be-filtered picture in the implementation of the present disclosure may be a reconstructed picture generated after reconstruction processing in the video encoding process, or a preset filtered picture obtained by performing preset filtering on the reconstructed picture by other preset filtering methods (which, for example, may be a de-blocking filtering method), which is not specifically limited in the implementations of the present disclosure.

In some implementations, before the separately obtaining at least two colour components of the to-be-filtered picture, the method further includes:

determining first auxiliary information corresponding to each original colour component based on the at least two original colour components of the to-be-filtered picture, wherein the first auxiliary information at least includes block dividing information and/or quantization parameter information.

Understandably, the first auxiliary information may be used to assist filtering and improve filtering quality. In an implementation of the present disclosure, the first auxiliary information may be not only block dividing information (such as CU dividing information and/or CTU dividing information), but also quantization parameter information, and even Motion Vector (MV) information, prediction direction information, etc. The information may be used, either alone or in any combination, as the first auxiliary information. For example, the block dividing information is used alone as the first auxiliary information, or the block dividing information and the quantization parameter information are used together as the first auxiliary information, or the block dividing information and the MV information are used together as the first auxiliary information, etc., which is not specifically limited in the implementations of the present disclosure.

Optionally, in some implementations, the separately obtaining at least two colour components of the to-be-filtered picture based on the to-be-filtered picture includes:

performing, based on at least two original colour components of the to-be-filtered picture, component processing on each of the at least two original colour components, to obtain the at least two colour components of the to-be-filtered picture.

Optionally, in some implementations, the separately obtaining at least two colour components of the to-be-filtered picture based on the to-be-filtered picture includes:

adding, based on at least two original colour components of the to-be-filtered picture, each of the at least two original colour components to the first auxiliary information corresponding to the each of the at least two original colour components, to obtain at least two colour components of the to-be-filtered picture.

It should be noted that "separately obtaining at least two colour components of the to-be-filtered picture" may be regarded as the first splitting stage. In this way, for the at least two original colour components of the to-be-filtered picture, component processing (such as deep learning) may be performed separately, so that at least two colour components may be obtained. In addition, the first auxiliary information corresponding to each original colour component may also be added to the corresponding colour component to obtain at least two colour components. That is, for the first splitting stage, the first auxiliary information may or may not be added, which is not specifically limited in the implementations of the present disclosure.

Optionally, in some implementations, the determining fusion information of the to-be-filtered picture includes:

fusing the at least two colour components of the to-be-filtered picture to obtain fusion information of the to-be-filtered picture.

Optionally, in some implementations, the determining fusion information of the to-be-filtered picture includes:

fusing the at least two colour components of the to-be-filtered picture with first auxiliary information corresponding to respective original colour components to obtain fusion information of the to-be-filtered picture.

It should be noted that "determining fusion information of the to-be-filtered picture" may be regarded as a merging stage. In this way, the fusion information of the to-be-filtered picture may be obtained by directly fusing the at least two colour components or by fusing the at least two colour components with corresponding first auxiliary information. That is, for the merging stage, the first auxiliary information may or may not be added, which is not specifically limited in the implementations of the present disclosure.

In a related technical solution, the filter in the filtering unit 104 as shown in FIG. 1 processes the three colour components separately, and three complete network forward calculations are required in total. However, for the in-loop filtering implementation method of an implementation of the present disclosure, by means of the fusion information, the three colour components may be input at one time, or any two of the three colour components may be input at the same time, which is not specifically limited in the implementations of the present disclosure. In this way, the issue that multiple complete network forward calculations are required for the multiple colour components is effectively avoided, and the calculation complexity is reduced.

It may also be understood that since the original picture may be divided into CTUs, or further divided into CUs from the CTUs, the in-loop filtering implementation method in the implementation of the present disclosure may be applied not only to CU-level in-loop filtering (in such a case, the block dividing information is CU dividing information), but also to CTU-level in-loop filtering (in such a case, the block dividing information is CTU dividing information), which is not specifically limited in the implementations of the present disclosure. Description will be made below by taking the case as an example where CU dividing information is used as the block dividing information.

In some implementations, the determining the first auxiliary information corresponding to each colour component includes:

performing, based on the original picture in the to-be-encoded video, coding unit (CU) division on each colour component of the at least two colour components of the original picture to obtain CU dividing information, and taking the CU dividing information as block dividing information corresponding to each colour component of the to-be-filtered picture.

Further, in some implementations, the taking the CU dividing information as the block dividing information corresponding to each colour component of the to-be-filtered picture includes:

according to the CU dividing information, filling a first value in each sample position corresponding to a CU boundary, and filling a second value in the other sample positions to obtain a first matrix corresponding to the CU dividing information, wherein the first value is different from the second value; and taking the first matrix as block dividing information corresponding to each colour component of the to-be-filtered picture.

It should be noted that the first value may be a preset numerical value, letter, etc., the second value may also be a preset numerical value, letter, etc., and the first value is different from the second value. For example, the first value may be set to 2, and the second value may be set to 1, which, however, is not specifically limited in the implementations of the present disclosure.

In an implementation of the present disclosure, the CU dividing information may be used as the first auxiliary information to assist the filtering processing of the to-be-filtered picture. That is, in the process of video encoding the original picture in the to-be-encoded video, the CU dividing information may be fully utilized to be fused with the at least two colour components of the to-be-filtered picture so as to guide filtering.

Figure 4:
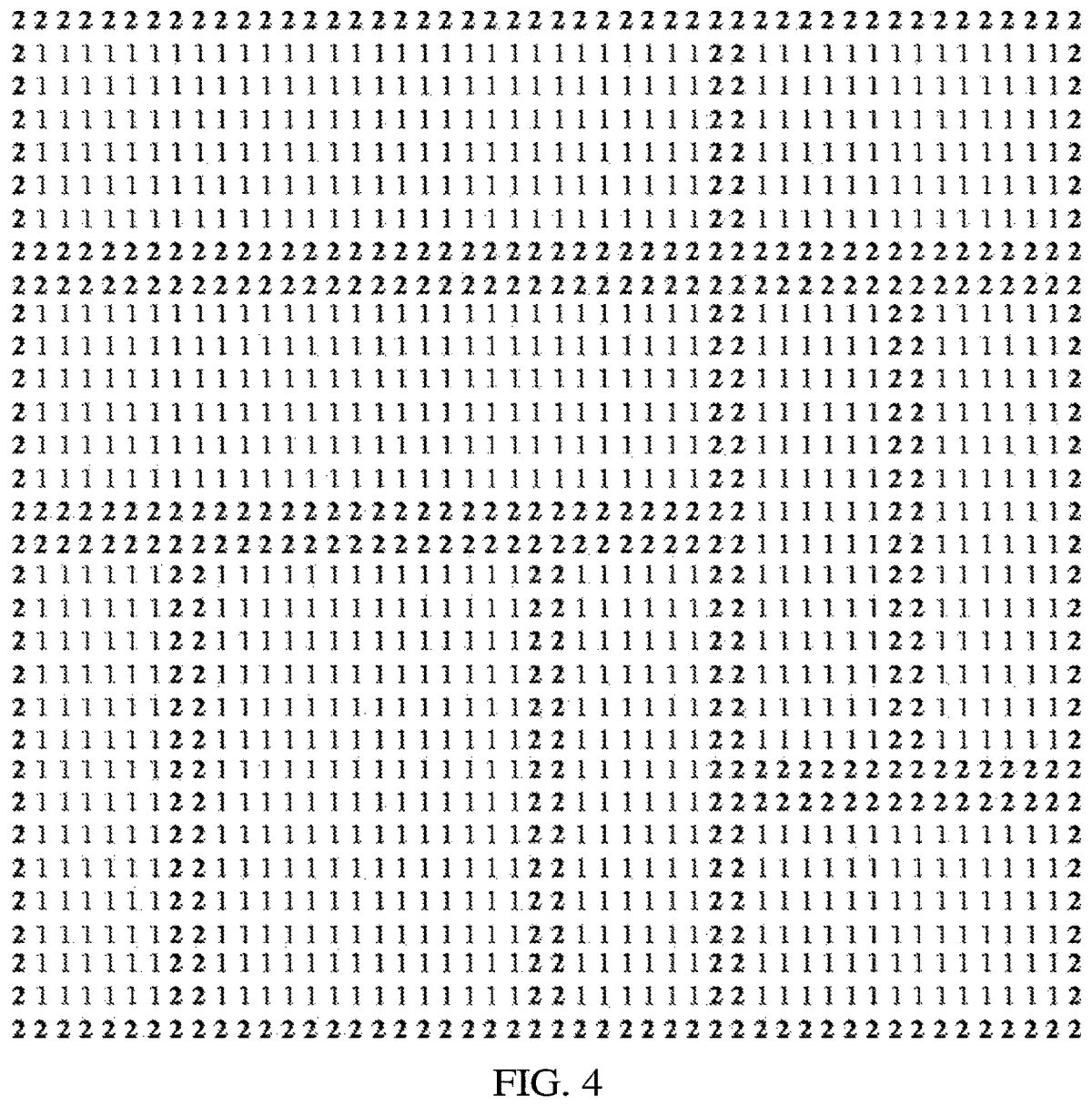

Specifically, the CU dividing information is converted into a Coding Unit Map (CU map), which is represented by a two-dimensional matrix, i.e., the CU map matrix, that is, the first matrix in the implementation of the present disclosure. That is, taking the first colour component of the original picture as an example, the first colour component may be divided into multiple CUs, each sample position corresponding to each CU boundary is filled with the first value, while the other sample positions are filled with the second value, and then a first matrix reflecting CU dividing information may be constructed. Illustratively, referring to FIG. 4, a schematic diagram of a structure of a block dividing matrix provided by an implementation of the present disclosure is shown. As shown in FIG. 4, if this figure represents one CTU, the CTU may be divided into 9 CUs. Assuming that the first value is set to 2 and the second value is set to 1, then each sample position corresponding to each CU boundary is filled with 2, while the other sample positions are filled with 1. That is, the sample positions filled with 2 represent the boundary of the CU, so that the CU dividing information, i.e., the first auxiliary information corresponding to the first colour component of the to-be-filtered picture, may be determined.

It should also be noted that if the first colour component is a luma component and both the second colour component and the third colour component are chroma components, the CU dividing information of the first colour component may be different from that of the second colour component or the third colour component. Therefore, when the CU dividing information of the first colour component is different from that of the second colour component or the third colour component, the CU dividing information corresponding to the first colour component of the to-be-filtered picture and the CU dividing information corresponding to the second colour component or the third colour component of the to-be-filtered picture need to be determined separately. Then the CU dividing information is added as the first auxiliary information to the corresponding first colour component, second colour component, or third colour component. When the CU dividing information of the first colour component is the same as that of the second colour component or the third colour component, only the CU dividing information of the first colour component, the second colour component or the third colour component may be determined, and then the determined CU dividing information may be added as the first auxiliary information to the corresponding first colour component, second colour component or third colour component. In this way, it is convenient to fuse the obtained at least two new colour components in a later stage, so as to perform in-loop filtering processing on the to-be-filtered picture.

In some implementations, the determining the first auxiliary information corresponding to each colour component includes:

acquiring, based on the original picture in the to-be-encoded video, quantization parameters corresponding to each of the at least two colour components of the original picture, and taking the quantization parameters as quantization parameter information corresponding to each colour component of the to-be-filtered picture.

Further, in some implementations, the taking the quantization parameters as quantization parameter information corresponding to each colour component of the to-be-filtered picture includes:

establishing a second matrix with the same size as each colour component of the original picture, wherein each sample position in the second matrix is filled with a normalized value of the quantization parameters corresponding to each colour component of the original picture; and taking the second matrix as quantization parameter information corresponding to each colour component of the to-be-filtered picture.

It should be noted that the to-be-filtered pictures corresponding to different quantization parameters do not have the same distortion degree. If they are incorporated into the quantization parameter information, the filtering network is enabled to adaptively own the ability to process any quantization parameter in the training process.

In an implementation of the present disclosure, the quantization parameter information may also be used as the first auxiliary information to assist the filtering processing of the to-be-filtered picture. That is, in the process of video encoding the original picture in the to-be-encoded video, the quantization parameter information may be fully utilized to be fused with the at least two colour components of the to-be-filtered picture so as to guide filtering. The quantization parameter information may be subjected to normalization processing, or the quantization parameter information may also be subjected to non-normalization processing (e.g., classification processing, interval dividing processing, etc.). Next, detailed description is made by taking the case as an example where the quantization parameters are normalized.

Specifically, the quantization parameter information is converted into a second matrix reflecting the quantization parameter information. That is, taking the first colour component of the original picture as an example, a matrix with the same size as the first colour component of the original picture is established, and each sample position in the matrix is filled with a normalized value of the quantization parameters corresponding to the first colour component of the original picture, wherein the normalized value of the quantization parameter is represented by $OP_{max}$ (x, y), i.e., $$QP_{max}(x, y) = \frac{QP}{QP_{max}}, \quad x = 0, 1, \ldots, H-1; y = 0, 1, \ldots, W-1 \quad (1)$$

In formula (1), QP represents a quantization parameter value corresponding to the first colour component of the original picture, x represents an abscissa value in each sample position in the first colour component of the original picture, y represents an ordinate value in each sample position in the first colour component of the original picture, $QP_{max}$ represents the maximum value of the quantization parameters, generally, the value of $QP_{max}$ is 51, but $QP_{max}$ can also be other values, such as 29, 31, etc., which is not specifically limited in the implementations of the present disclosure.

In some implementations, before the separately obtaining at least two colour components of the to-be-filtered picture, the method further includes:

determining second auxiliary information corresponding to each original colour component based on the at least two original colour components of the to-be-filtered picture, wherein the second auxiliary information is different from the first auxiliary information.

Optionally, in some implementations, the determining fusion information of the to-be-filtered picture includes:

fusing the at least two colour components of the to-be-filtered picture with second auxiliary information corresponding to respective original colour components to obtain the fusion information of the to-be-filtered picture.

Optionally, in some implementations, the separately obtaining at least two colour components of the to-be-filtered picture based on the to-be-filtered picture includes:

adding, based on at least two original colour components of the to-be-filtered picture, each of at least two original colour components to the second auxiliary information corresponding to the each of at least two original colour components to, to obtain at least two colour components of the to-be-filtered picture.

It should be noted that the first auxiliary information is different from the second auxiliary information. Both the first auxiliary information and the second auxiliary information may be used to assist filtering and improve filtering quality. In an implementation of the present disclosure, the first auxiliary information may be one or more of block dividing information, quantization parameter information, MV information, prediction direction information, etc., and the second auxiliary information may also be one or more of block dividing information, quantization parameter information, MV information, prediction direction information, etc. That is, when the first auxiliary information is the block dividing information, the second auxiliary information may be the quantization parameter information; or when the first auxiliary information is the quantization parameter information, the second auxiliary information may be the block dividing information; or when the first auxiliary information is the block dividing information and the quantization parameter information, the second auxiliary information may be the MV information; or when the first auxiliary information is the block dividing information, the second auxiliary information may be the quantization parameter information and the MV information, which is not specifically limited in the implementations of the present disclosure. It should also be noted that the fusion stages of the first auxiliary information and the second auxiliary information may be the same or may be different. In an implementation of the present disclosure, it is assumed that the first splitting stage is used to represent a processing stage corresponding to obtaining at least two colour components of a to-be-filtered picture, the merging stage is used to represent a processing stage corresponding to determining fusion information of the to-be-filtered picture, and the second splitting stage is used to represent a processing stage corresponding to determining residual information of each colour component after the fusion processing. In this way, the fusion stage of the first auxiliary information may be any one of the first splitting stage, the merging stage and the second splitting stage, and the fusion stage of the second auxiliary information may also be any one of the first splitting stage, the merging stage and the second splitting stage. That is, the fusion stage of the first auxiliary information may be the first splitting stage, and the fusion stage of the second auxiliary information may be the merging stage; or the fusion stage of the first auxiliary information may be the merging stage, and the fusion stage of the second auxiliary information may be the first splitting stage; or the fusion stage of the first auxiliary information may be the second splitting stage, and the fusion stage of the second auxiliary information may be the merging stage; or the fusion stage of the first auxiliary information may be the first splitting stage, and the fusion stage of the second auxiliary information may be the second splitting stage; or the fusion stage of the first auxiliary information may be the first splitting stage, and the fusion stage of the second auxiliary information may also be the first splitting stage; or the fusion stage of the first auxiliary information may be the merging stage, and the fusion stage of the second auxiliary information may also be the merging stage, which is not specifically limited in the implementations of the present disclosure.

In some implementations, the performing in-loop filtering processing on the to-be-filtered picture based on the fusion information to obtain at least one filtered colour component of the to-be-filtered picture includes:

acquiring residual information corresponding to at least one original colour component of the at least two original colour components based on the fusion information; and summing the at least one original colour component of the at least two original colour components and the residual information corresponding to the at least one original colour component, to obtain at least one filtered colour component of the to-be-filtered picture.

It should be noted that the in-loop filtering implementation method in the implementation of the present disclosure employs a multistage concatenate processing structure, e.g., a splitting-merging-splitting processing structure, a splitting-merging processing structure, a merging-splitting processing structure, etc., which is not specifically limited in the implementations of the present disclosure.

Specifically, if it is required that at least two colour components of the to-be-filtered picture are obtained first, i.e., the first splitting stage, and then the at least two colour components are fused, i.e., the merging stage, in such a case, after all information is fused, when multiple colour components, such as the first colour component, the second colour component and the third colour component, need to be output at the same time, by jointly processing the fusion information, the residual information corresponding to the first colour component, the residual information corresponding to the second colour component and the residual information corresponding to the third colour component are obtained, and then the first colour component and the residual information corresponding to the first colour component are summed, the second colour component and the residual information corresponding to the second colour component are summed, and the third colour component and the residual information corresponding to the third colour component are summed to obtain the filtered first colour component of the to-be-filtered picture, the filtered second colour component of the to-be-filtered picture and the filtered third colour component of the to-be-filtered picture respectively. This processing is the second splitting stage, and the entire in-loop filtering process employs the splitting-merging-splitting processing structure.

If it is required that at least two colour components of the to-be-filtered picture are obtained first, i.e., the first splitting stage, and then the at least two colour components are fused, i.e., the merging stage, in such a case, after all information is fused, when only one colour component, such as the first colour component, needs to be output, by jointly processing the fusion information, the residual information corresponding to the first colour component is obtained, and then the first colour component and the residual information corresponding to the first colour component are summed to obtain the filtered first colour component of the to-be-filtered picture. There is no second splitting stage in this processing, and the entire in-loop filtering process employs the splitting-merging processing structure.

In addition, if there is no need to obtain at least two colour components of the to-be-filtered picture, i.e., the first splitting stage is not needed, at least two colour components of the to-be-filtered picture can be directly fused, i.e., the processing proceeds directly to the merging stage; and after all information is fused, as multiple colour components need to be output at the same time, there is still a need for a second splitting stage, and then the entire in-loop filtering process employs the merging-splitting processing structure.

It should also be noted that the in-loop filtering implementation method in the implementation of the present disclosure may also employ more concatenate processing structures, such as a splitting-merging-splitting-merging-splitting processing structure. For these concatenate processing structures, the implementations of the present disclosure may employ typical concatenate structures, such as a splitting-merging-splitting processing structure, and may also employ a concatenate processing structure having fewer stages than the typical concatenate structure, such as a splitting-merging processing structure or a merging-splitting processing structure; and may even employ a concatenate processing structure having more stages than the typical concatenate structure, such as a splitting-merging-splitting-merging-splitting processing structure, which is not specifically limited in the implementations of the present disclosure.

In some implementations, the improved in-loop filter includes a convolutional neural network filter.

It should be noted that the improved in-loop filter is used for implementing in-loop filtering processing of the to-be-filtered picture. The improved in-loop filter may be a convolutional neural network filter or other filters established by deep learning, which is not specifically limited in the implementations of the present disclosure. Here, the convolutional neural network filter, also called CNN filter, is a kind of feedforward neural network including convolution calculation and having a deep structure, and is one of the representative algorithms of deep learning. An input layer of the CNN filter may process multidimensional data, e.g., three colour component (Y/U/V) channels of the original picture in the to-be-encoded video.

Figure 5:
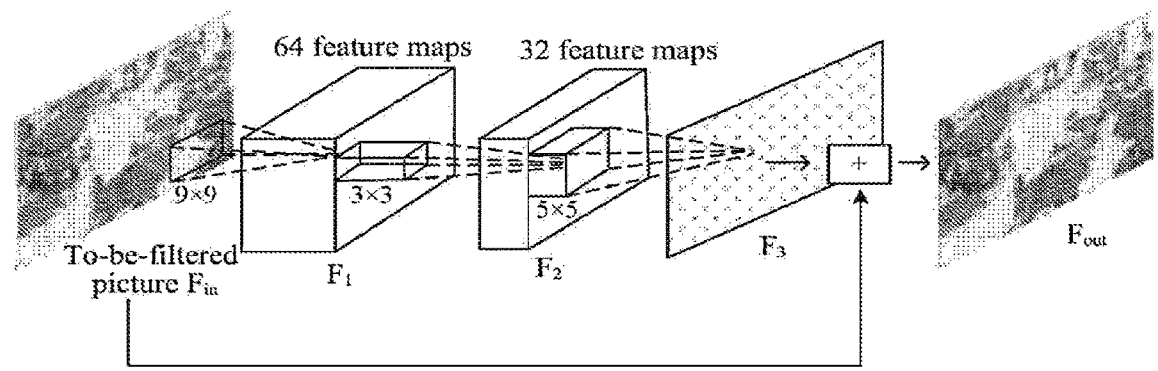
FIG. 5 is a schematic diagram of a composition structure of a traditional CNN filter provided by an implementation of the present disclosure.

Referring to FIG. 5, a schematic diagram of a composition structure of a traditional CNN filter 50 provided by an implementation of the present disclosure is shown. As shown in FIG. 5, the traditional CNN filter 50 is improved on the basis of the previous generation video coding standard H.265/High Efficiency Video Coding (HEVC), which includes a two-layer convolutional network structure and can replace the de-blocking filter and the sample adaptive offset filter. After the to-be-filtered picture (represented by $F_{in}$) is input to the input layer of the traditional CNN filter 50, it passes through the first layer convolutional network $F_1$ (assuming that the convolutional kernel has a size of 3×3 and includes 64 feature maps) and the second layer convolutional network $F_2$ (assuming that the convolutional kernel has a size of 5×5 and includes 32 feature maps) in sequence, and then residual information $F_3$ is obtained; and then the to-be-filtered picture $F_{in}$ and the residual information $F_3$ are summed to finally obtain a filtered picture (represented by $F_{out}$) output by the traditional CNN filter 50. The convolutional network structure is also called residual neural network, which is used to output residual information corresponding to the to-be-filtered picture. In this traditional CNN filter 50, the three colour components (Y/U/V) of the to-be-filtered picture are processed separately, but they share the same filtering network and related parameters of the filtering network.

Figure 6A:
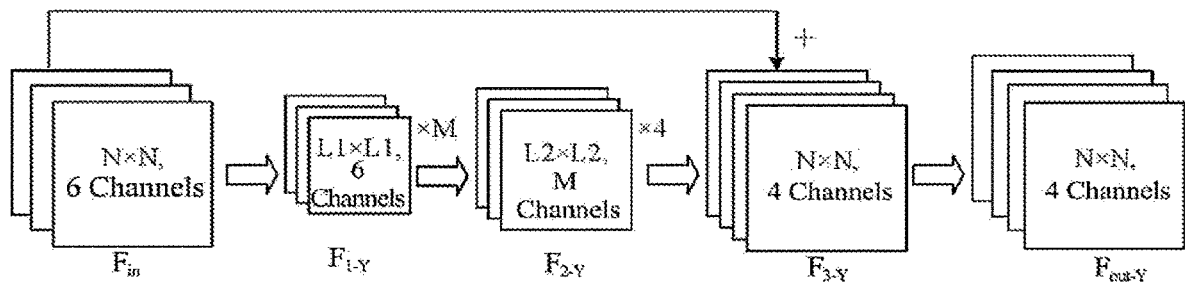
FIG. 6A and FIG. 6B are schematic diagrams of composition structures of another traditional CNN filter provided by an implementation of the present disclosure.
Figure 6B:
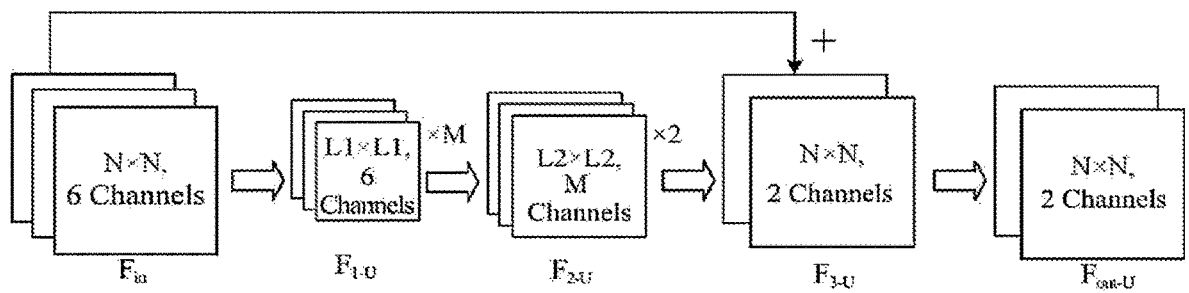

Referring to FIG. 6A and FIG. 6B, they show schematic diagrams of composition structures of another traditional CNN filter 60 provided by an implementation of the present disclosure. The traditional CNN filter 60 employs two filtering networks. The filtering network shown in FIG. 6A is dedicated to outputting the first colour component, and the filtering network shown in FIG. 6B is dedicated to outputting the second colour component or the third colour component. Assuming that the original picture in the to-be-encoded video has a height of H and a width of W, then the size information corresponding to the first colour component is H×W, and pixel rearrangement processing may be performed on the first colour component to convert the first colour component into the form of $H/2 \times W/2 \times 4$; and as the size information corresponding to the second colour component or the third colour component is $H/2 \times W/2$, then the three colour components are combined, i.e., transformed into the form of $H/2 \times W/2 \times 6$, and input to the traditional CNN filter 60. Based on the filtering network as shown in FIG. 6A, after the input layer network receives the to-be-filtered picture $F_{in}$ (assuming that the convolutional kernel size is N×N and the number of channels is 6), the to-be-filtered picture passes through the first layer convolutional network $F_{1-Y}$ (assuming that the convolutional kernel size is L1×L1, the number of convolutional kernels is M and the number of channels is 6) and the second layer convolutional network $F_{2-Y}$ (assuming that the convolutional kernel size is L2×L2, the number of convolutional kernels is 4 and the number of channels is M), and then residual information $F_{3-Y}$ is obtained (assuming that the convolutional kernel size is N×N and the number of channels is 4); and then the input to-be-filtered picture $F_{in}$ and the residual information $F_{3-Y}$ are summed to finally obtain a filtered first colour component (represented by $F_{out-Y}$) output by the traditional CNN filter 60. Based on the filtering network as shown in FIG. 6B, after the input layer network receives the to-be-filtered picture $F_{in}$ (assuming that the convolutional kernel size is N×N and the number of channels is 6), the to-be-filtered picture passes through the first layer convolutional network $F_{1\text{-}U}$, (assuming that the convolutional kernel size is L1×L1, the number of convolutional kernels is M and the number of channels is 6) and the second layer convolutional network $F_{2\text{-}U}$ (assuming that the convolutional kernel size is L2×L2, the number of convolutional kernels is 2 and the number of channels is M), and then residual information $F_3$-is obtained (assuming that the convolutional kernel size is N×N and the number of channels is 2); and then the input to-be-filtered picture $F_{in}$ and the residual information $F_{3\text{-}U}$ are summed to finally obtain a filtered second colour component or a filtered third colour component (represented by $F_{out\text{-}U}$) output by the traditional CNN filter 60.

For the traditional CNN filter 50 shown in FIG. 5 or the traditional CNN filter 60 shown in FIG. 6A and FIG. 6B, it is unreasonable to process each colour component separately because the relationship between different colour components is not considered. In addition, the coding parameters such as block dividing information and QP information are not fully utilized at the input end. The distortion of a reconstructed picture mainly results from block effect, and the boundary information of block effect is determined by CU dividing information. That is, the filtering network in the CNN filter should focus on the boundary region. In addition, incorporating the quantization parameter information into the filtering network also helps to improve the generalization ability of the filtering network, so that it can filter distorted pictures of arbitrary quality. Therefore, in the in-loop filtering implementation method provided by the implementation of the present disclosure, the CNN filtering structure is set reasonably, so that a single filtering network can simultaneously receive multiple colour components, and the relationship between the multiple colour components is fully considered, so that enhanced pictures of these colour components may also be output at the same time after the filtering processing. In addition, in the in-loop filtering implementation method, the coding parameters such as the block dividing information and/or QP information are incorporated as the auxiliary information for auxiliary filtering, so that the filtering quality is improved.

It should be noted that, specifically, "obtaining at least two colour components of the to-be-filtered picture" in the implementation of the present disclosure may refer to the case where for the first colour component, the second colour component and the third colour component of the to-be-filtered picture, the auxiliary information (such as the first auxiliary information or the second auxiliary information) corresponding to each colour component is determined, and three colour components can be obtained after addition processing; or the case where for the first colour component and the second colour component of the to-be-filtered picture, the auxiliary information corresponding to each colour component is determined, and two colour components can be obtained after addition processing; or the case where for the first colour component and the third colour component of the to-be-filtered picture, the auxiliary information corresponding to each colour component is determined, and two colour components can be obtained after addition processing; or even the case where for the second colour component and the third colour component of the to-be-filtered picture, the auxiliary information corresponding to each colour component is determined, and two new colour components can be obtained after addition processing, which is not specifically limited in the implementations of the present disclosure.

It should also be noted that the fusion information of the to-be-filtered picture may be obtained by directly fusing at least two colour components, or by fusing at least two colour components and corresponding auxiliary information (such as the first auxiliary information or the second auxiliary information), which is not specifically limited in the implementations of the present disclosure.

If the fusion information is obtained by directly fusing at least two colour components, it may be the case that the first colour component, the second colour component and the third colour component of the to-be-filtered picture are fused to obtain the fusion information; it may also be the case that the first colour component and the second colour component of the to-be-filtered picture are fused to obtain the fusion information; it may also be the case that the first colour component and the third colour component of the to-be-filtered picture are fused to obtain the fusion information; and it may even be the case that the second colour component and the third colour component of the to-be-filtered picture are fused to obtain the fusion information.

If the fusion information is obtained by fusing at least two colour components and the corresponding auxiliary information (such as the first auxiliary information or the second auxiliary information), it may be the case that the first colour component, the second colour component and the third colour component of the to-be-filtered picture and the auxiliary information are fused to obtain the fusion information; it may also be the case that the first colour component and the second colour component of the to-be-filtered picture and the auxiliary information are fused to obtain the fusion information; it may also be the case that the first colour component and the third colour component of the to-be-filtered picture and the auxiliary information are fused to obtain the fusion information; and it may even be the case that the second colour component and the third colour component of the to-be-filtered picture and the auxiliary information are fused to obtain the fusion information. Specifically, "fusing at least two colour components and the corresponding auxiliary information (such as the first auxiliary information or the second auxiliary information)" may refer to the practice of first fusing at least two colour components of the to-be-filtered picture and then fusing the auxiliary information therewith; or refer to the practice of first fusing each of the at least two colour components of the to-be-filtered picture with the corresponding auxiliary information and then fusing the processed at least two colour components. That is, the specific way of fusion processing is not specifically limited in the implementations of the present disclosure.

In addition, for "performing in-loop filtering processing on the to-be-filtered picture based on the fusion information to obtain at least one filtered colour component of the to-be-filtered picture" in the implementation of the present disclosure, specifically, after multiple colour components (such as the first colour component, the second colour component and the third colour component) of the to-be-filtered picture and the auxiliary information (such as the first auxiliary information or the second auxiliary information) are fused and input to the filtering network, it may be the case that only the filtered first colour component, the filtered second colour component, or the filtered third colour component of the to-be-filtered picture is output; it may also be the case that the filtered first colour component and the filtered second colour component of the to-be-filtered picture, or the filtered second colour component and the filtered third colour component of the to-be-filtered picture, or the filtered first colour component and the filtered third colour component of the to-be-filtered picture are output; and it may even be the case that the filtered first colour component, the filtered second colour component and the filtered third colour component of the to-be-filtered picture are output, which is not specifically limited in the implementations of the present disclosure.

Figure 7:
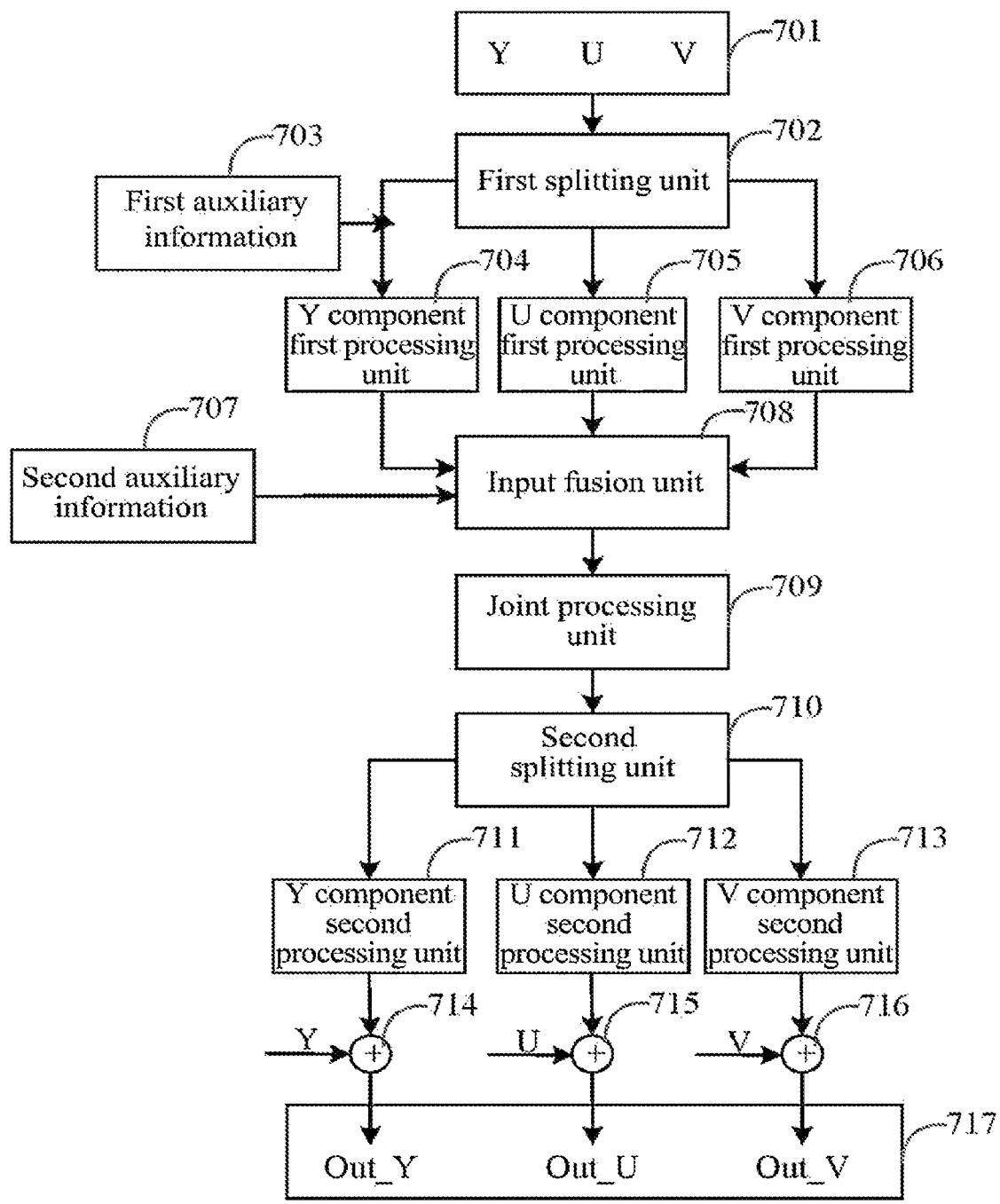
FIG. 7 is a schematic diagram of a composition structure of an in-loop filtering framework provided by an implementation of the present disclosure.

Taking the case as an example where three colour components of the to-be-filtered picture are input into the filtering network at the same time and a concatenate processing structure of splitting-merging-splitting is used, referring to FIG. 7, a schematic diagram of a composition structure of an in-loop filtering framework 70 provided by an implementation of the present disclosure is shown. As shown in FIG. 7, the in-loop filtering framework 70 may include three colour components (represented by Y, U and V respectively) 701 of the to-be-filtered picture, a first splitting unit 702, first auxiliary information 703, a Y colour component first processing unit 704, a U colour component first processing unit 705, a V colour component first processing unit 706, second auxiliary information 707, an input fusion unit 708, a joint processing unit 709, a second splitting unit 710, a Y colour component second processing unit 711, a U colour component second processing unit 712, a V colour component second processing unit 713, a first adder 714, a second adder 715, a third adder 716, and three filtered colour components (represented by Out_Y, Out_U and Out_V, respectively) 717. Specifically, after passing through the first splitting unit 702, the three colour components 701 of the to-be-filtered picture will be split into three signals: a Y colour component, a U colour component and a V colour component. The first Y colour component and its corresponding first auxiliary information 703 enter the Y colour component first processing unit 704, the second U colour component and its corresponding first auxiliary information 703 enter the U colour component first processing unit 705, and the third V colour component and its corresponding first auxiliary information 703 enter the V colour component first processing unit 706; and three new colour components will be output. The input fusion unit 708 is configured to fuse the three new colour components with the second auxiliary information 707, and then input the same to the joint processing unit 709. The joint processing unit 709 includes a multi-layer convolutional filtering network, which is configured to perform convolution calculation on the input information. Since the specific convolution calculation process is similar to that in a related technical solution, the specific execution acts of the joint processing unit 709 will not be described further. After passing through the joint processing unit 709, the colour components will enter the second splitting unit 710 to be re-split into three signals, and then the three signals are respectively input to the Y colour component second processing unit 711, the U colour component second processing unit 712 and the V colour component second processing unit 713, and residual information of the Y colour component, residual information of the U colour component and residual information of the V colour component can be obtained in sequence. The Y colour component of the three colour components 701 of the to-be-filtered picture and the obtained residual information of the Y colour component are input to the first adder 714 together, and the output of the first adder 714 is the filtered Y colour component (represented by Out_Y). The U colour component of the three colour components 701 of the to-be-filtered picture and the obtained residual information of the U colour component are input to the second adder 715 together, and the output of the second adder 715 is the filtered U colour component (represented by Out_U). The V colour component of the three colour components 701 of the to-be-filtered picture and the obtained residual information of the V colour component are input to the third adder 716 together, and the output of the third adder 716 is the filtered V colour component (represented by Out_V). Here, for the output components, if only the filtered Y colour component needs to be output, the in-loop filtering framework 70 may not include the second splitting unit 710, the second adder 715 and the third adder 716; if only the filtered U colour component needs to be output, the in-loop filtering framework 70 may not include the second splitting unit 710, the first adder 714 and the third adder 716; and if the filtered Y colour component and the filtered U colour component need to be output, the in-loop filtering framework 70 may not include the third adder 716, which is not specifically limited in the implementations of the present disclosure.

Figure 8:
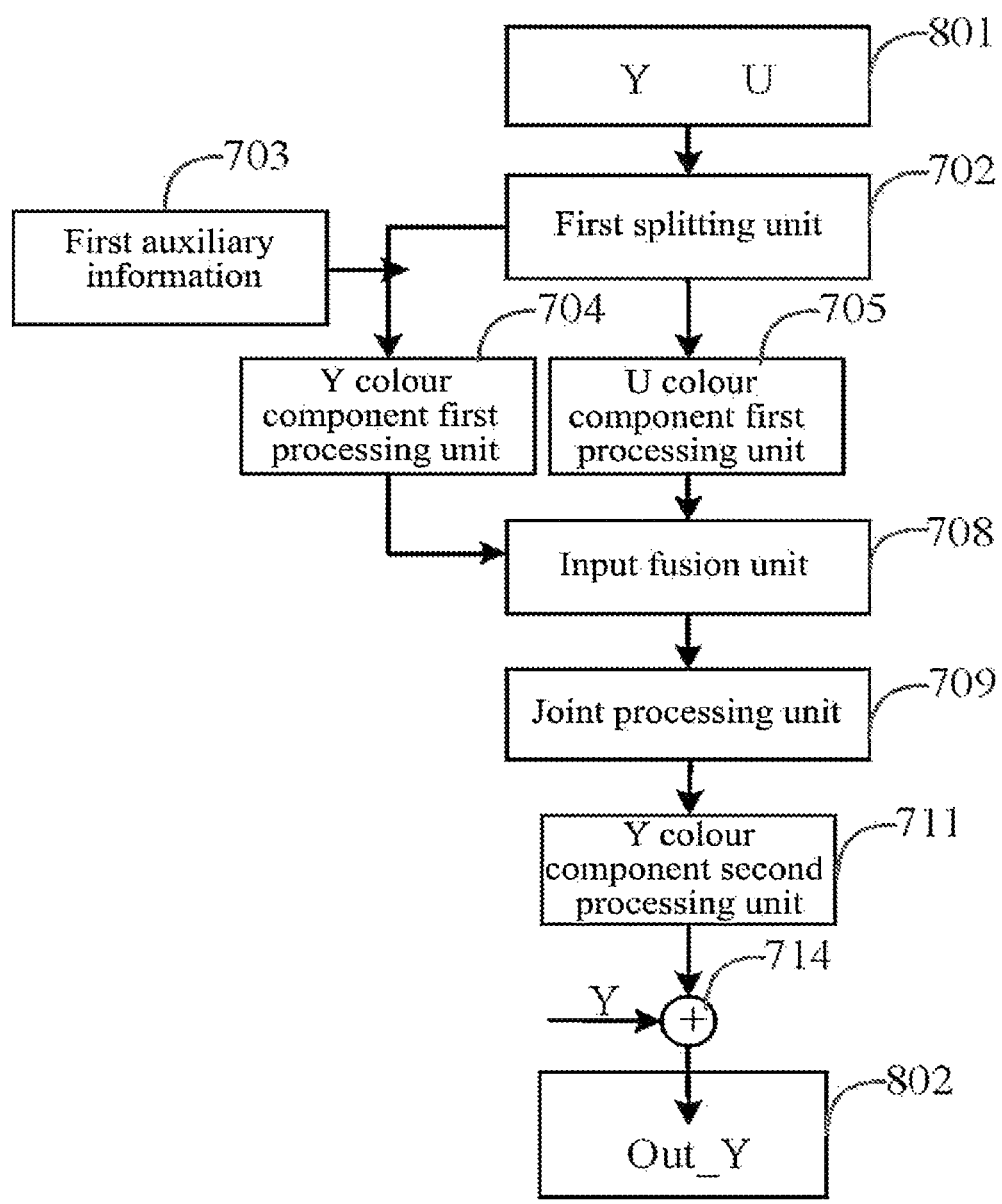
FIG. 8 is a schematic diagram of a composition structure of another in-loop filtering framework provided by an implementation of the present disclosure.

Taking the case as an example where two colour components of the to-be-filtered picture are input into the filtering network at the same time and a concatenate processing structure of splitting-merging is used, referring to FIG. 8, a schematic diagram of a composition structure of another in-loop filtering framework 80 provided by an implementation of the present disclosure is shown. As shown in FIG. 8, the in-loop filtering framework 80 may include two colour components (represented by Y and U respectively) 801 of the to-be-filtered picture, a first splitting unit 702, first auxiliary information 703, a Y colour component first processing unit 704, a U colour component first processing unit 705, an input fusion unit 708, a joint processing unit 709, a Y colour component second processing unit 711, a first adder 714, and a filtered colour component (represented by Out_Y) 802. Specifically, after passing through the first splitting unit 702, the two colour components 801 of the to-be-filtered picture will be split into two signals: a Y colour component and a U colour component. The first Y colour component and its corresponding first auxiliary information 703 enter the Y colour component first processing unit 704, and the second U colour component and its corresponding first auxiliary information 703 enter the U colour component first processing unit 705; and two new colour components will be output. The input fusion unit 708 is configured to fuse the two new colour components and then input the same to the joint processing unit 709. After passing through the joint processing unit 709, as only a single colour component (i.e., the filtered Y colour component) needs to be output, the colour components do not need to enter the second splitting unit 710 at this time, and can be directly input to the Y colour component second processing unit 711, to obtain residual information of the Y colour component. The Y colour component of the two colour components 801 of the to-be-filtered picture and the obtained residual information of the Y colour component are input to the first adder 714 together, and the output of the first adder 714 is the filtered Y colour component (represented by Out_Y).

It should be noted that, since the size information of the Y colour component may be different from that of the U colour component or the V colour component, in the in-loop filtering framework 70 shown in FIG. 7 or the in-loop filtering framework 80 shown in FIG. 8, an up-sampling unit (or a deconvolution unit or a super-resolution unit) may be added before the U colour component first processing unit 705 and the V colour component first processing unit 706 to perform up-sampling processing, so that the up-sampled U colour component or the up-sampled V colour component is consistent with the V colour component in resolution to facilitate the subsequent in-loop filtering processing. In addition, taking the in-loop filtering framework 70 shown in FIG. 7 as an example, the improved in-loop filter in the implementations of the present disclosure may at least include an input fusion unit 708, a joint processing unit 709, a first adder 714, a second adder 715 and a third adder 716; may also include a first splitting unit 702, a Y colour component first processing unit 704, a U colour component first processing unit 705, a V colour component first processing unit 706, etc.; and may even include a second splitting unit 710, a Y colour component second processing unit 711, a U colour component second processing unit 712, a V colour component second processing unit 713, etc., which is not specifically limited in the implementations of the present disclosure.

In addition, in the implementations of the present disclosure, the in-loop filtering implementation method may employ a splitting-merging-splitting processing structure, such as the in-loop filtering framework 70 shown in FIG. 7; may employ a splitting-merging processing structure with fewer stages, such as the in-loop filtering framework 80 shown in FIG. 8; may also employ a merging-splitting processing structure with fewer stages; and may even employ a merging-splitting processing structure with fewer stages or a splitting-merging-splitting-merging-splitting processing structure with more stages, which is not specifically limited in the implementations of the present disclosure.

It should also be noted that the first auxiliary information and the second auxiliary information may both be involved in the in-loop filtering processing, e.g., the in-loop filtering framework 70 shown in FIG. 7. The first auxiliary information and the second auxiliary information may also be selectively involved in the in-loop filtering processing, e.g., the in-loop filtering framework 80 shown in FIG. 8, wherein the second auxiliary information is not involved in the in-loop filtering processing. In the implementations of the present disclosure, it may be the case that the first auxiliary information and the second auxiliary information are both involved in the in-loop filtering processing, it may also be the case that the first auxiliary information is not involved in the in-loop filtering processing, it may also be the case that the second auxiliary information is not involved in the in-loop filtering processing, and it may even be the case that neither of the first auxiliary information and the second auxiliary information is involved in the in-loop filtering processing, which is not specifically limited in the implementations of the present disclosure.

It should further be noted that the fusion stage of the first auxiliary information and the fusion stage of the second auxiliary information may be the same or different. That is, the first auxiliary information and the second auxiliary information may be involved in the in-loop filtering processing at the same stage, or may be involved in the in-loop filtering processing at different stages, which is not specifically limited in the implementations of the present disclosure. For example, still taking the in-loop filtering framework 70 shown in FIG. 7 as an example, the first auxiliary information 703 and the second auxiliary information 707 may both be involved in the in-loop filtering processing in the stage corresponding to the first splitting unit 702. Alternatively, the first auxiliary information 703 and the second auxiliary information 707 may both be involved in the in-loop filtering processing in the stage corresponding to the input fusion unit 708. Alternatively, the first auxiliary information 703 and the second auxiliary information 707 may both be involved in the in-loop filtering processing in the stage corresponding to the second splitting unit 710. Alternatively, the first auxiliary information 703 is involved in the in-loop filtering processing in the stage corresponding to the first splitting unit 702, and the second auxiliary information 707 is involved in the in-loop filtering processing in the stage corresponding to the input fusion unit 708. Alternatively, the first auxiliary information 703 is involved in the in-loop filtering processing before the stage corresponding to the first splitting unit 702, and the second auxiliary information 707 is involved in the in-loop filtering processing in the stage corresponding to the input fusion unit 708. Alternatively, the first auxiliary information 703 is involved in the in-loop filtering processing before the stage corresponding to the first splitting unit 702, and the second auxiliary information 707 is involved in the in-loop filtering processing in the stage corresponding to the second splitting unit 710. Alternatively, the first auxiliary information 703 is involved in the in-loop filtering processing in the stage corresponding to the input fusion unit 708, and the second auxiliary information 707 is involved in the in-loop filtering processing in the stage corresponding to the second splitting unit 710. That is, the first auxiliary information 703 and the second auxiliary information 707 may flexibly select the fusion stage in the concatenate processing structure, which is not specifically limited in the implementations of the present disclosure.

Taking the in-loop filtering framework 70 shown in FIG. 7 as an example, it uses a deep learning network (such as CNN) for in-loop filtering, and differs from the traditional CNN filter in that the improved in-loop filter in the implementations of the present disclosure adopts a concatenate processing structure, enables simultaneous input of three colour components of the to-be-filtered picture into the filtering network, and also incorporates other coding-related auxiliary information (e.g., the coding parameters such as the block dividing information, the quantization parameter information and the MV information), wherein these auxiliary information can be incorporated into the filtering network in the same stage or in different stages. In this way, the relationship between the three colour components is fully utilized, and other coding-related auxiliary information is used to assist filtering, which improves the filtering quality. In addition, the three colour components are processed at the same time, which effectively avoids the issue that three complete network forward calculations are needed for the three colour components, thereby reducing the calculation complexity and saving the coding rate. For example, taking VTM3.0 as a standard, in an experimental test, it is found that compared with the related technical solutions, the in-loop filtering implementation method of the implementation of the present disclosure can simultaneously achieve a bit rate drop of 6.4% for the Y colour component, a bit rate drop of 9.8% for the U colour component, and a bit rate drop of 11.6% for the V colour component, on the same premise of restoring video quality, thereby saving the coding rate.

The above implementation provides an in-loop filtering implementation method, in which a to-be-filtered picture is acquired, the to-be-filtered picture is generated from an original picture during video encoding of a to-be-encoded video, the to-be-encoded video includes an original picture frame, and the original picture frame includes the original picture; at least two colour components of the to-be-filtered picture are separately obtained based on the to-be-filtered picture; fusion information of the to-be-filtered picture is determined, the fusion information is obtained by fusing the at least two colour components; and in-loop filtering processing is performed on the to-be-filtered picture based on the fusion information to obtain at least one filtered colour component of the to-be-filtered picture. In this way, a concatenate processing structure is adopted, and coding parameters such as block dividing information and/or QP information are used as auxiliary information to be fused with multiple input colour components, which fully utilizes the relationship between the multiple colour components, reduces the calculation complexity, saves the coding rate, and also further improves the subjective and objective quality of the video reconstructed pictures in the encoding and decoding process.

Figure 9:
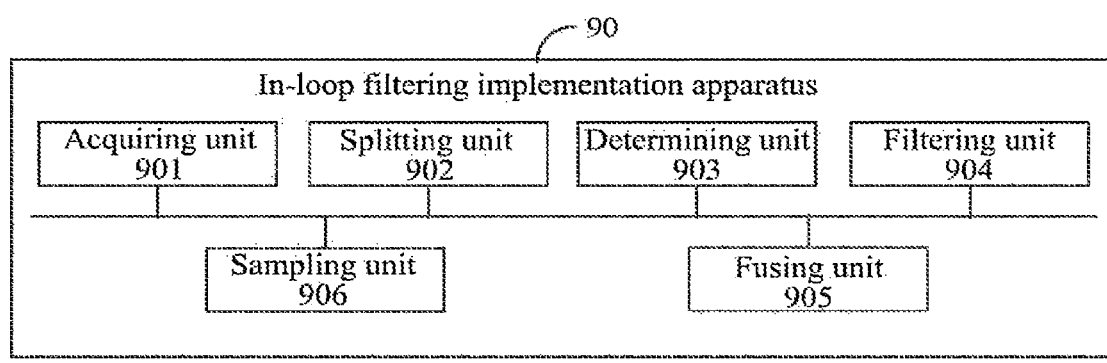
FIG. 9 is a schematic diagram of a composition structure of an in-loop filtering implementation apparatus provided by an implementation of the present disclosure.

Based on the same inventive concept as that in the preceding implementations, referring to FIG. 9, a schematic diagram of a composition structure of an in-loop filtering implementation apparatus 90 provided by an implementation of the present disclosure is shown. The in-loop filtering implementation apparatus 90 may include an acquiring unit 901, a splitting unit 902, a determining unit 903 and a filtering unit 904, wherein the acquiring unit 901 is configured to acquire a to-be-filtered picture, wherein the to-be-filtered picture is generated from an original picture during video encoding of a to-be-encoded video, the to-be-encoded video includes an original picture frame, and the original picture frame includes the original picture;

the splitting unit 902 is configured to separately obtain at least two colour components of the to-be-filtered picture, based on the to-be-filtered picture;

the determining unit 903 is configured to determine fusion information of the to-be-filtered picture, wherein the fusion information is obtained by fusing the at least two colour components; and the filtering unit 904 is configured to perform in-loop filtering processing on the to-be-filtered picture based on the fusion information to obtain at least one filtered colour component of the to-be-filtered picture.

In the above solution, the splitting unit 902 is specifically configured to perform, based on at least two original colour components of the to-be-filtered picture, component processing on each of the at least two original colour components, to obtain the at least two colour components of the to-be-filtered picture.

In the above solution, the in-loop filtering implementation apparatus 90 further includes a fusing unit 905, which is configured to fuse the at least two colour components of the to-be-filtered picture to obtain fusion information of the to-be-filtered picture.

In the above solution, the determining unit 903 is further configured to determine, based on the at least two original colour components of the to-be-filtered picture, first auxiliary information corresponding to each original colour component, wherein the first auxiliary information at least includes block dividing information and/or quantization parameter information.

In the above solution, the splitting unit 902 is further configured to add, based on the at least two original colour components of the to-be-filtered picture, the first auxiliary information corresponding to respective original colour components to the respective at least two original colour components, to obtain at least two colour components of the to-be-filtered picture.

In the above solution, the fusing unit 905 is further configured to fuse the at least two colour components of the to-be-filtered picture with the first auxiliary information corresponding to respective original colour components to obtain fusion information of the to-be-filtered picture.

In the above solution, the splitting unit 902 is further configured to acquire residual information corresponding to at least one original colour component of the at least two original colour components based on the fusion information; and the filtering unit 904 is specifically configured to sum the at least one original colour component of the at least two original colour components and the residual information corresponding to the at least one original colour component, to obtain at least one filtered colour component of the to-be-filtered picture.

In the above solution, the determining unit 903 is further configured to determine second auxiliary information corresponding to each original colour component based on the at least two original colour components of the to-be-filtered picture, wherein the second auxiliary information is different from the first auxiliary information.

In the above solution, the fusing unit 905 is further configured to fuse the at least two colour components of the to-be-filtered picture with the second auxiliary information corresponding to respective original colour components to obtain the fusion information of the to-be-filtered picture.

In the above solution, the splitting unit 902 is further configured to add, based on the at least two original colour components of the to-be-filtered picture, the second auxiliary information corresponding to respective original colour components to the respective at least two original colour components, to obtain at least two colour components of the to-be-filtered picture.

In the above solution, the acquiring unit 901 is specifically configured to perform video encoding processing on an original picture in a to-be-encoded video, and take a generated reconstructed picture as the to-be-filtered picture; or the acquiring unit 901 is specifically configured to perform video encoding processing on an original picture in a to-be-encoded video to generate a reconstructed picture; and perform preset filtering processing on the reconstructed picture, and take the picture after preset filtering as the to-be-filtered picture.

In the above solution, referring to FIG. 9, the in-loop filtering implementation apparatus 90 further includes a sampling unit 906 configured to select a low-resolution colour component from the at least two original colour components of the to-be-filtered picture and perform up-sampling processing on the low-resolution colour component.

As can be appreciated, in this implementation, the "unit" may be part of a circuit, part of a processor, part of a program or software, etc., and may also be a module, or may be non-modular. Moreover, various components in the implementation may be integrated into one processing unit, or various units may be physically present separately, or two or more units may be integrated into one unit. The integrated unit may be implemented in a form of hardware, or may be implemented in a form of a software functional module.

The integrated unit, if implemented in a form of a software functional module and not sold or used as an independent product, may be stored in a computer-readable storage medium. Based on such understanding, the technical solution of the implementation, in essence, or the part contributing to the prior art, or all or part of the technical solution, may be embodied in a form of a software product, which is stored in a storage medium, and includes several instructions for causing a computer device (which may be a personal computer, a server, or a network device, etc.) or a processor to perform all or part of acts of the method of the implementation. The aforementioned storage medium includes various media, such as a U disk, a mobile hard disk, a Read Only Memory (ROM), a Random Access Memory (RAM), a magnetic disk, or an optical disk, which are capable of storing program codes.

Therefore, the implementation provides a computer storage medium on which an in-loop filtering implementation program is stored, when the in-loop filtering implementation program is executed by at least one processor, the acts of the method in the preceding implementation being implemented.

Figure 10:
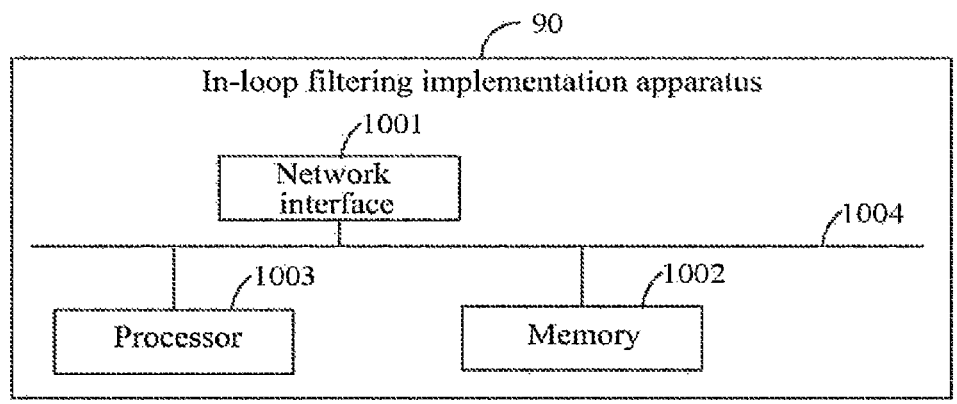
FIG. 10 is a schematic diagram of a specific hardware structure of an in-loop filtering implementation apparatus provided by an implementation of the present disclosure.

Based on the above-mentioned composition of the in-loop filtering implementation apparatus 90 and the computer storage medium, referring to FIG. 10, it shows a specific hardware structure example of the in-loop filtering implementation apparatus 90 provided by an implementation of the present disclosure, which may include a network interface 1001, a memory 1002 and a processor 1003. The various components are coupled together through a bus system 1004. It may be understood that the bus system 1004 is used for implementing connection and communication between these components. In addition to a data bus, the bus system 1004 also includes a power bus, a control bus, and a status signal bus. However, for clarity, all kinds of buses are uniformly referred to as the bus system 1004 in FIG. 10. The network interface 1001 is configured to receive and send signals in the process of sending information to or receiving information from other external network elements.

The memory 1002 is configured to store a computer program which is capable of being run on the processor 1003.

The processor 1003 is configured to perform, when the computer program is run, the acts of:

acquiring a to-be-filtered picture, wherein the to-be-filtered picture is generated from an original picture during video encoding of a to-be-encoded video, the to-be-encoded video includes an original picture frame, and the original picture frame includes the original picture;

separately obtaining at least two colour components of the to-be-filtered picture, based on the to-be-filtered picture;

determining fusion information of the to-be-filtered picture, wherein the fusion information is obtained by fusing the at least two colour components; and performing in-loop filtering processing on the to-be-filtered picture based on the fusion information to obtain at least one filtered colour component of the to-be-filtered picture.

It may be understood that the memory 1002 in the implementation of the present disclosure may be a volatile memory or a non-volatile memory, or may include both a volatile memory and a non-volatile memory. The non-volatile memory may be a Read-Only Memory (ROM), a programmable ROM (PROM), an Erasable PROM (EPROM), an Electrically EPROM (EEPROM), or a flash memory. The volatile memory may be a Random Access Memory (RAM), which is used as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 1002 in the systems and methods described here is intended to include, without being limited to, these and any other suitable types of memory.

The processor 1003 may be an integrated circuit chip with a signal processing capability. In an implementation process, the acts of the methods described above may be accomplished by integrated logic circuits of hardware in the processor 1003 or instructions in a form of software. The processor 1003 described above may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, acts and logical block diagrams disclosed in the implementations of the present disclosure. The general purpose processor may be a microprocessor, or the processor may also be any conventional processor, or the like. The acts of the methods disclosed in the implementations of the present disclosure may be directly implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the memory 1002, and the processor 1003 reads the information in the memory 1002 and accomplishes the acts of the above method in combination with its hardware.

It may be understood that the implementations described herein may be implemented by hardware, software, firmware, middleware, microcode or a combination thereof. For the implementation by hardware, and the processing units may be implemented in one or more Application Specific Integrated Circuits (ASIC), Digital Signal Processors (DSP), DSP Devices (DSPD), Programmable Logic Devices (PLD), Field-Programmable Gate Arrays (FPGA), general-purpose processors, controllers, microcontrollers, other electronic units for performing the functions described in the present disclosure, or combinations thereof.

For the implementation by software, the techniques described herein may be implemented by the modules (e.g., procedures, functions, etc.) that perform the functions described herein. Software codes may be stored in a memory and executed by a processor. The memory may be implemented in the processor or external to the processor.

Optionally, as another implementation, the processor 1003 is further configured to execute the acts of the method described in the previous implementations when the computer program is run.

It should be noted that the technical solutions described in the implementations of the present disclosure may be combined arbitrarily without conflict.

What are described above are merely specific implementations of the present disclosure, but the protection scope of the present disclosure is not limited thereto. Any variation or substitution that may be easily conceived by a person familiar with the art within the technical scope disclosed by the present disclosure shall be included within the protection scope of the present disclosure. Therefore, the protection scope of the present disclosure shall be determined by the protection scope of the claims.

INDUSTRIAL APPLICABILITY

In the implementations of the present disclosure, first, a to-be-filtered picture is acquired, the to-be-filtered picture being generated from an original picture during video encoding of a to-be-encoded video. Then at least two colour components of the to-be-filtered picture are separately obtained based on the to-be-filtered picture, and this processing may be regarded as a splitting stage. Further, fusion information of the to-be-filtered picture is determined, wherein the fusion information is obtained by fusing the at least two colour components, and this processing may be regarded as a merging stage. In this way, by employing a concatenate processing structure and fusing the input multiple colour components, the relationship between the multiple colour components is fully utilized, and the issue that multiple complete network forward calculations are needed for these multiple colour components is effectively avoided, thereby reducing the calculation complexity and saving the coding rate. Finally, in-loop filtering processing is performed on the to-be-filtered picture based on the fusion information to obtain at least one filtered colour component of the to-be-filtered picture. In this way, filtering can be further assisted by fusion information, which improves the subjective and objective quality of video reconstructed pictures in the encoding and decoding process.

What we claim is:

1. An in-loop filtering implementation method, comprising:
   performing, based on at least two original colour components of a to-be-filtered picture, component processing respectively on each of the at least two original colour components, to obtain at least two colour components after the component processing;
   performing in-loop filtering processing based on the at least two colour components after the component processing;
   further comprising: acquiring the to-be-filtered picture, comprising:
   performing video encoding processing on an original picture, and taking a generated reconstructed picture as the to-be-filtered picture; or
   performing video encoding processing on the original picture to generate a reconstructed picture; and performing preset filtering processing on the reconstructed picture, and taking the picture after preset filtering as the to-be-filtered picture; wherein the performing in-loop filtering processing based on the at least two colour components after the component processing comprises: inputting the at least two colour components at one time: wherein the at least two colour components comprises two of a first colour component, a second colour component and a third colour component of the to-be-filtered picture, and the at least one filtered colour component comprises only one of a filtered first colour component, a filtered second colour component, or a filtered third colour component of the to-be-filtered picture of the to-be-filtered picture.

2. The method according to claim 1, wherein before obtaining at least two colour components after the component processing, the method further comprises:
   determining first auxiliary information corresponding to each original colour component based on the at least two original colour components of the to-be-filtered picture, wherein the first auxiliary information at least comprises block dividing information and/or quantization parameter information.

3. The method according to claim 2, wherein performing, based on at least two original colour components of a to-be-filtered picture, component processing respectively on each of the at least two original colour components, to obtain at least two colour components after the component processing, comprises:
   adding, based on the at least two original colour components of the to-be-filtered picture, each of the at least two original colour components to the first auxiliary information corresponding to the each of the at least two original colour components, to obtain the at least two colour components of the to-be-filtered picture.

4. The method according to claim 1, wherein before performing component processing respectively on each of the at least two original colour components, to obtain at least two colour components after the component processing, the method further comprises:
   determining second auxiliary information corresponding to each original colour component based on the at least two original colour components of the to-be-filtered picture, wherein the second auxiliary information is different from the first auxiliary information.

5. The method according to claim 1, wherein performing in-loop filtering processing based on the at least two colour components after the component processing comprises:
   adding, based on at least two original colour components of the to-be-filtered picture, each of at least two original colour components to second auxiliary information corresponding to the each of at least two original colour components, to obtain the at least two colour components of the to-be-filtered picture.

6. The method according to claim 1, wherein the method further comprises:
   selecting a low-resolution colour component from the at least two original colour components of the to-be-filtered picture; and
   performing up-sampling processing on the low-resolution colour component.

7. An in-loop filtering implementation apparatus, comprising: a memory and a processor, wherein the memory is configured to store a computer program which is capable of being run on the processor; and
   the processor is configured to, when the computer program is run,
   perform, based on at least two original colour components of a to-be-filtered picture, component processing respectively on each of the at least two original colour components, to obtain at least two colour components after the component processing;
   and
   perform in-loop filtering processing based on the at least two colour components after the component processing;
   wherein the processor is configured to acquire the to-be-filtered picture, comprising:
   performing video encoding processing on an original picture, and taking a generated reconstructed picture as the to-be-filtered picture; or
   performing video encoding processing on the original picture to generate a reconstructed picture; and performing preset filtering processing on the reconstructed picture, and taking the picture after preset filtering as the to-be-filtered picture: wherein the processor is configured to input the at least two colour components at one time: wherein the at least two colour components comprises two of a first colour component, a second colour component and a third colour component of the to-be-filtered picture, and the at least one filtered colour component comprises only one of a filtered first colour component, a filtered second colour component, or a filtered third colour component of the to-be-filtered picture of the to-be-filtered picture.

8. The in-loop filtering implementation apparatus according to claim 7, wherein the processor is configured to determine, based on the at least two original colour components of the to-be-filtered picture, first auxiliary information corresponding to each original colour component, wherein the first auxiliary information at least comprises block dividing information and/or quantization parameter information.

9. The in-loop filtering implementation apparatus according to claim 8, wherein the processor is configured to add, based on the at least two original colour components of the to-be-filtered picture, each of the at least two original colour components to the first auxiliary information corresponding to the each of the at least two original colour components, to obtain the at least two colour components of the to-be-filtered picture.

10. A non-transitory computer storage medium, on which an in-loop filtering implementation program is stored, wherein, when the in-loop filtering implementation program is executed by at least one processor, the processor is caused to:

perform, based on at least two original colour components of a to-be-filtered picture, component processing respectively on each of the at least two original colour components, to obtain at least two colour components after the component processing;

perform in-loop filtering processing based on the at least two colour components after the component processing;

wherein the processor is configured to acquire the to-be-filtered picture, comprising:

performing video encoding processing on an original picture, and taking a generated reconstructed picture as the to-be-filtered picture; or performing video encoding processing on the original picture to generate a reconstructed picture; and performing preset filtering processing on the reconstructed picture, and taking the picture after preset filtering as the to-be-filtered picture: wherein the processor is configured to input the at least two colour components at one time: wherein the at least two colour components comprises two of a first colour component, a second colour component and a third colour component of the to-be-filtered picture, and the at least one filtered colour component comprises only one of a filtered first colour component, a filtered second colour component, or a filtered third colour component of the to-be-filtered picture of the to-be-filtered picture.

* * * * *